(12) United States Patent
Carter et al.

(10) Patent No.: US 11,807,778 B2
(45) Date of Patent: Nov. 7, 2023

(54) INFLUENCE OF PARTIAL SIDE CHAIN HYDROLYSIS ON THE GROWTH AND MORPHOLOGY OF REACTIVE POLYMER MULTILAYERS FABRICATED USING AZLACTONE-FUNCTIONALIZED POLYMERS

(71) Applicant: Wisconsin Alumni Research Foundation, Madison, WI (US)

(72) Inventors: Matthew Carter, Madison, WI (US); David M. Lynn, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 578 days.

(21) Appl. No.: 16/211,078

(22) Filed: Dec. 5, 2018

(65) Prior Publication Data
US 2020/0181419 A1    Jun. 11, 2020

(51) Int. Cl.
C09D 5/00     (2006.01)
C09D 139/04   (2006.01)
C09D 179/02   (2006.01)

(52) U.S. Cl.
CPC ........... C09D 5/002 (2013.01); C09D 139/04 (2013.01); C09D 179/02 (2013.01)

(58) Field of Classification Search
CPC ..... C09D 5/002; C09D 139/04; C09D 179/02
See application file for complete search history.

(56) References Cited

U.S. PATENT DOCUMENTS

| 8,071,210 | B2  | 12/2011 | Lynn et al. |           |
|-----------|-----|---------|-------------|-----------|
| 2017/0022371 | A1* | 1/2017 | Lynn ........ | C09D 5/1625 |
| 2017/0022372 | A1* | 1/2017 | Lynn ........ | C09D 5/1681 |
| 2018/0230318 | A1 | 8/2018 | Lynn et al. |           |

OTHER PUBLICATIONS

U.S. Appl. No. 15/192,364, filed Jun. 24, 2016.
U.S. Appl. No. 15/192,425, filed Jun. 24, 2016.
U.S. Appl. No. 15/471,628, filed Mar. 28, 2017.
Appadoo et al., "Controlling the Surface-Mediated Release of DNA Using 'Mixed Multilayers'", *Bioengineering & Translational Medicine*, 1(2):181-192 (2016).
Bergbreiter et al., "Covalent layer-by-layer assembly-an effective, forgiving way to construct functional robust ultrathin films and nanocomposites", *Soft Matter*, 5(1):23 (2009).
Borges et al., "Molecular Interactions Driving the Layer-by-Layer Assembly of Multilayers," *Chemical Reviews*, 114(18):8883 (2014).
Broderick et al., "Fabrication and Selective Functionalization of Amine-Reactive Polymer Multilayers on Topographically Patterned Microwell Cell Culture Arrays", *Biomacromolecules*, 12 (6):1998-2007 (2011).

(Continued)

*Primary Examiner* — Samir Shah
(74) *Attorney, Agent, or Firm* — Leydig, Voit & Mayer, Ltd.

(57) ABSTRACT

The present invention provides methods of making polymer-based multilayer thin films, and polymer-based multilayer thin films made thereof, using controlled hydrolysis of functional side groups, such as azlactone groups, to obtain desired levels of roughness, porosity, and chemical reactivity.

12 Claims, 11 Drawing Sheets

(56) References Cited

OTHER PUBLICATIONS

Broderick et al., "Fabrication of Oligonucleotide and Protein Arrays on Rigid and Flexible Substrates Coated with Reactive Polymer Multilayers", *ACS Applied Materials & Interfaces*, 5(2):351 (2013).
Broderick et al., "In situ Synthesis of Oligonucleotide Arrays on Surfaces Coated with Crosslinked Polymer Multilayers," *Chemistry of Materials*, 24(5):938-945 (2012).
Broderick et al., "Covalent Layer-by-Layer Assembly of Water-Permeable and Water-Impermeable Polymer Multilayers on Highly Water-Soluble and Water-Sensitive Substrates", *Chemistry of Materials*, 24(10):1786-1795 (2012).
Buck et al., "Chemical Modification of Reactive Multilayered Films Fabricated from Poly(2-alkenyl azlactone)s Design of Surfaces that Prevent or Promote Mammalian Cell Adhesion and Bacterial Biofilm Growth," *Biomacromolecules*, 10(6):1564 (2009).
Buck et al. "Azlactone-functionalized polymers as reactive platforms for the design of advanced materials Progress in the last ten years," *Polymer Chemistry*, 3(1):66 (2012).
Buck et al., "Free-Standing and Reactive Thin Films Fabricated by Covalent Layer-by-Layer Assembly and Subsequent Lift-Off of Azlactone-Containing Polymer Multilayers," *Langmuir*, 26(20):16134 (2010).
Buck et al. "Functionalization of Fibers Using Azlactone-Containing Polymers Layer-by-Layer Fabrication of Reactive Thin Films on the Surfaces of Hair and Cellulose-Based Materials," *ACS Applied Materials & Interfaces*, 2(5):1421 (2010).
Buck et al. "Reactive Layer-by-Layer Assembly of Suspended Thin Films and Semipermeable Membranes at Interfaces Created Between Aqueous and Organic Phases," *Advanced Materials*, 22(9):994 (2010).
Buck et al. "Superhydrophobic Thin Films Fabricated by Reactive Layer-by-Layer Assembly of Azlactone-Functionalized Polymers," *Chemistry of Materials*, 22(23):6319 (2010).
Buck et al. "Layer-by-Layer Assembly of Reactive Ultrathin Films Mediated by Click-Type Reactions of Poly(2-Alkenyl Azlactone)s," *Advanced Materials*, 19(22):3951 (2007).
Carter et al., "Synthesis and Characterization of Backbone Degradable Azlactone-Funclionalized Polymers," *Macromolecules*, 49(15):5514 (2016).
Carter et al., "Covalently Crosslinked and Physically Stable Polymer Coatings with Chemically Labile and Dynamic Surface Features Fabricated by Treatment of Azlactone-Containing Multilayers with Alcohol-, Thiol-, and Hydrazine-Based Nucleophiles," *Chemistry of Materials*, 28(14):5063 (2016).
Decher, "Fuzzy nanoassemblies Toward layered polymeric multicomposites", *Science*, 277(5330): 1232 (1997).
Fredin et al., Nanoimprinted Thin Films of Reactive, Azlactone-Containing Polymers Combining Methods for the Topographic Patterning of Cell Substrates with Opportunities for Facile Post-Fabrication Chemical Functionalization, *Biomacromolecules*, 10(4):994-1003 (2013).
Gardner et al., Reactive Polyanions Based on Poly(4,4-dimethyl-2-vinyl-2-oxazoline-5-one-co-methacrylic acid). *Macromolecules*, 44(18):7115 (2011).
Gilbert et al., "Depth-profiling X-ray photoelectron spectroscopy (XPS) analysis of interlayer diffusion in polyelectrolyte multilayers," *Proceedings of the National Academy of Sciences*, 110(17):6651 (2013).
Guo et al., "Covalent Immobilization of Caged Liquid Crystal Microdroplets on Surfaces," *ACS Applied Materials & Interfaces*, 7(48):26892 (2015).
Hammond, "P. T. Engineering materials layer-by-layer: Challenges and opportunities in multilayer assembly," *AIChE Journal*, 57(11):2928 (2011).
Hammond, "Form and Function in Multilayer Assembly New Applications at the Nanoscale," *Advanced Materials*, 16(15):1271 (2004).
Heilmann et al., "The Chemistry of 2-Alkenyl-5(4H)-Oxaznlones. IX. Acid-Catalyzed Oligomerization," *J. of Macromolecular Science, Part A*, 40(8):755 (2003).
Heilmann et al., "Chemistry and technology of 2-alkenyl azlactones," *J. of Polymer, Science Part A, Polymer Chemistry*, 39(21):3655 (2001).
Holden et al., "Photolithographic Synthesis of High-Density DNA and RNA Arrays on Flexible, Transparent, and Easily Subdivided Plastic Substrates", *Analytical Chemistry*, 87(22):11420 (2015).
Kinsinger et al., "Dynamic Ordering Transitions of Liquid Crystals Driven by Interfacial Complexes Formed between Polyanions and Amphiphilic Polyamines", *Langmuir*, 24(23):13231 (2008).
Kratochvil et al., "Amine-Reactive Azlactone-Containing Nanofibers For the Immobilization and Patterning of New Functionality on Nanofiber-Based Scaffolds", *ACS Applied Materials and Interfaces*, 9:10243-10253 (2017).
Kratochvil et al., "Nanoporous Superhydrophobic Coatings that Promote the Extended Release of Water-Labile Quorum Sensing Inhibitors and Enable Long-Term Modulation of Quorum Sensing in Staphylococcus aureus," *ACS Biomaterials Science & Engineering*, 1(10):1039-1049 (2015).
Kratochvil, et al., "Slippery Liquid-Infused Porous Surfaces that Prevent Bacterial Surface Fouling and Inhibit Virulence Phenotypes in Surrounding Planktonic Cells", *ACS Infectious Diseases*, 2(7): 509 (2016).
Manna et al., "'Shrink-to-Fit' Superhydrophobicity Thermally-Induced Microscale Wrinkling of Thin Hydrophobic Multilayers Fabricated on Flexible Shrink-Wrap Substrates," *Advanced Materials*, 25(22):3085 (2013).
Manna et al., "Chemical Patterning and Physical Refinement of Reactive Superhydrophobic Surfaces," *Advanced Materials*, 24(31):4291 (2012).
Manna et al., "Superhydrophobic Polymer Multilayers that Promote the Extended, Long-Term Release of Embedded Water-Soluble Agents," *Advanced Materials*, 25(44):6405 (2013).
Manna et al., "Fabrication of Liquid-Infused Surfaces Using Reactive Polymer Multilayers Principles for Manipulating the Behaviors and Mobilities of Aqueous Fluids on Slippery Liquid Interfaces," *Advanced Materials*, 27(19):3007 (2015).
Manna et al., "Patterning and Impregnation of Superhydrophobic Surfaces Using Aqueous Solutions," *ACS Applied Materials & Interfaces*, 5(16):7731 (2013).
Manna et al., "Restoration of Superhydrophobicity in Crushed Polymer Films by Treatment with Water Self-Healing and Recovery of Damaged Topographic Features Aided by an Unlikely Source," *Advanced Materials*, 25(36):5104 (2013).
Manna et al., "Synthetic Surfaces with Robust and Tunable Underwater Superoleophobicity," *Advanced Functional Materials*, 25(11):1672 (2015).
Manna et al., "Slippery Liquid-Infused Porous Surfaces that Prevent Microbial Surface Fouling and Kill Non-Adherent Pathogens in Surrounding Media A Controlled Release Approach", *Advanced Functional Materials*, 26(21):3599 (2016).
Manna et al., "Liquid Crystal Chemical Sensors That Cells Can Wear", *Angewandte Chemie International Edition*, 52(52):14011 (2013).
Nolte et al., "Thin Film Thickness Gradients and Spatial Patterning via Salt Etching of Polyelectrolyle Multilayers", *Macromolecules*, 40(15):5479 (2007).
Nolte et al., "Effect of Relative Humidity on the Young's Modulus of Polyelectrolyte Multilayer Films and Related Nonionic Polymers", *Macromolecules*, 41(15):5793 (2008).
Quinn et al., "Next generation, sequentially assembled ultrathin films beyond electrostatics," *Chemical Society Reviews*, 36(5):707 (2007).
Rasmussen et al., "Crosslinked, hydrophilic, azlactone-functional polymeric beads a two-step approach," *Reactive Polymers*, 16(2):199 (1992).
Richardson et al., "Technology-driven layer-by-layer assembly of nanofilms", *Science*, 348(6233):aaa2491 (2015).
Rydzek et al., "Strategies for covalently reticulated polymer multilayers," *Soft Matter*, 8(38):9738 (2012).

(56) References Cited

OTHER PUBLICATIONS

Schönhoff, "Self-assembled polyelectrolyte multilayers," *Current Opinion in Colloid & Interface Science*, 8(1): 86 (2003).
Tang et al., "Biomedical Applications of Layer-by-Layer Assembly From Biomimetics to Tissue Engineering", *Advanced Materials*, 18(24):3203 (2006).
Wang et al., "Bioinspired Surfaces with Superwettability New Insight on Theory, Design, and Applications," *Chemical Reviews*, 115(16):8230 (2015).
Wen et al., "Bioinspired Super-Wettability from Fundamental Research to Practical Applications," *Angewandte Chemie-International Edition*, 54(11):3387 (2015).
Wood et al., "Controlling interlayer diffusion to achieve sustained, multiagent delivery from layer-by-layer thin films," *Proceedings of the National Academy of Sciences*, 103(27):10207 (2006).
Xiao et al., "Layer-by-layer assembly of versatile nanoarchitectures with diverse dimensionality a new perspective for rational construction of multilayer assemblies", *Chemical Society Reviews*, Issue 11 (2016).
Zacharia et al., "Controlling Diffusion and Exchange in Layer-by-Layer Assemblies," *Macromolecules*, 40(5):1598 (2007).
Zacharia et al., "Factors Influencing the Interdiffusion of Weak Polycations in Multilayers," *Macromolecules*, 40(26):9523 (2007).

\* cited by examiner

INFLUENCE OF PARTIAL SIDE CHAIN HYDROLYSIS ON THE GROWTH AND MORPHOLOGY OF REACTIVE POLYMER MULTILAYERS FABRICATED USING AZLACTONE-FUNCTIONALIZED POLYMERS

STATEMENT REGARDING FEDERALLY SPONSORED RESEARCH OR DEVELOPMENT

This invention was made with government support under DMR1121288 awarded by the National Science Foundation and N00014-14-1-0791 and N00014-07-1-0255 awarded by the NAVY/ONR. The government has certain rights in the invention.

BACKGROUND OF THE INVENTION

Polymer-based coatings are widely used to functionalize and define physicochemical properties of surfaces and interfaces. Layer-by-layer approaches to the fabrication of thin polymer 'multilayers' are particularly useful and versatile in this regard (Decher, G., Science, 1997, 277(5330): 1232; and Schönhoff, M., Current Opinion in Colloid & Interface Science 2003, 8(1): 86).

In general, these methods fall into one of two broad categories depending on the type of interactions that drive film growth: (i) aqueous-based approaches that leverage polyvalent weak interactions between mutually interacting polymers (e.g., through ionic interactions, hydrogen bonding, etc.), or (ii) reactive/covalent approaches that exploit reactions between polymers containing mutually reactive groups (see Schönhoff, M., Current Opinion in Colloid & Interface Science 2003, 8(1): 86; Hammond, P. T., Advanced Materials 2004, 16(15): 1271; Decher, G., In Multilayer Thin Films: Sequential Assembly of Nanocomposite Materials, 2nd Edition; Decher, G.; Schlenoff, J. B., Eds.; Wiley-CVH, 2012; Xiao et al., Chemical Society Reviews, 2016; Borges et al., Chemical Reviews, 2014, 114(18): 8883; Quinn et al., Chemical Society Reviews, 2007, 36(5): 707; Bergbreiter et al., Soft Matter, 2009, 5(1): 23; Rydzek et al., Soft Matter 2012, 8(38): 9738; and Broderick, A. H.; Lynn, D. M. In Functional Polymers by Post-Polymerization Modification; Wiley-VCH Verlag GmbH & Co. KGaA, 2013).

These approaches are inherently versatile, providing control over molecular composition (e.g., through the choice of the constituent polymers), film thickness (e.g., by controlling the number of assembly cycles), and film architecture (e.g., by designing stratified or hierarchical films using multiple different sets of components or building blocks) (see Schönhoff, M., Current Opinion in Colloid & Interface Science 2003, 8(1): 86; Hammond, P. T., Advanced Materials 2004, 16(15): 1271; Decher, G., In Multilayer Thin Films: Sequential Assembly of Nanocomposite Materials, 2nd Edition; Decher, G.; Schlenoff, J. B., Eds.; Wiley-CVH, 2012; Xiao et al., Chemical Society Reviews, 2016, 45: 3088; Borges et al., Chemical Reviews, 2014, 114(18): 8883; Tang et al., Advanced Materials 2006, 18(24): 3203; and Hammond, P. T., AIChE Journal 2011, 57(11): 2928).

Although a significant amount of effort has led to the development of a general understanding of the behaviors of layer-by-layer polymer coatings, a number of factors, including the intermixing or interdiffusion of polymer layers and other structural reorganizations that can occur during or after film fabrication can influence film morphology and give rise to otherwise unexpected structures and bulk or surface properties (see Wood et al., PNAS, 2006, 103(27): 10207; Zacharia et al., Macromolecules, 2007, 40(5): 1598; Zacharia et al., Macromolecules, 2007, 40(26): 9523; Gilbert et al., PNAS, 2013, 110(17): 6651; Decher, G., Science, 1997, 277(5330): 1232; Decher, G., In Multilayer Thin Films: Sequential Assembly of Nanocomposite Materials, 2nd Edition; Decher, G.; Schlenoff, J. B., Eds.; Wiley-CVH, 2012; Nolte et al., Macromolecules, 2007, 40(15): 5479; and Nolte et al., Macromolecules 2008, 41(15): 5793).

These inherent complexities in layer-by-layer assembly can be useful, and they often result in the unexpected discovery of coatings and interfaces with new features or new types of behaviors that are of interest in many fundamental and applied contexts (see Decher, G., Science, 1997, 277(5330): 1232; Decher, G., In Multilayer Thin Films: Sequential Assembly of Nanocomposite Materials, 2nd Edition; Decher, G.; Schlenoff, J. B., Eds.; Wiley-CVH, 2012; Xiao et al., Chemical Society Reviews, 2016, 45: 3088; Borges et al., Chemical Reviews 2014, 114(18): 8883; and Richardson et al., Science, 2015, 348(6233): aaa2491).

Past studies have described the reactive layer-by-layer assembly of poly(2-vinyl-4,4-dimethylazlactone) (PVDMA), a polymer bearing amine-reactive side chain functionality, and poly(ethylenimine) (PEI), a hyperbranched polymer with primary amine end groups (see Buck et al., Advanced Materials, 2007, 19(22): 3951; Buck et al., Polymer Chemistry 2012, 3(1): 66; and U.S. Pat. No. 8,071,210). These past studies demonstrate that interfacial reactions between the azlactone groups in PVDMA and the primary amines in PEI can drive layer-by-layer assembly, and that the resulting multilayers contain residual azlactone groups that can be used for further functionalization and to tailor surface and bulk properties (see also Broderick A. H. and Lynn, D. M. In Functional Polymers by Post-Polymerization Modification; Wiley-VCH Verlag GmbH & Co. KGaA, 2013; and Buck et al., Advanced Materials 2007, 19(22): 3951).

These PEI/PVDMA multilayers are useful in at least three ways: (i) as is typical of most other layer-by-layer assembly processes, these films can be fabricated on a broad range of substrates, including curved and topologically complex substrates, (ii) the assemblies that result are stable in chemically complex environments, owing to the formation of hydrolytically stable polyacrylamide-type crosslinks, and (iii) these films can be functionalized, and their surface and bulk properties can be manipulated and tuned, by treatment of these azlactone-containing coatings with a broad range of amine-, alcohol-, and thiol-containing nucleophiles (see Buck et al., Advanced Materials 2007, 19 (22), 3951; Buck et al., Polymer Chemistry, 2012, 3(1): 66; Buck et al., Langmuir 2010, 26(20): 16134; Buck et al., ACS Applied Materials & Interfaces 2010, 2(5): 1421; Buck et al., Advanced Materials 2010, 22(9): 994; Broderick et al., Biomacromolecules 2011, 12 (6): 1998; Broderick et al., Chemistry of Materials 2012, 24(10): 1786; Broderick et al., Chemistry of Materials 2012, 24(5): 938; Manna et al., Advanced Materials 2012, 24(31): 4291; Manna et al., Advanced Functional Materials 2015, 25(11): 1672; Carter et al., Chemistry of Materials 2016, 28(14): 5063).

The potential utility of these PEI/PVDMA coatings has been demonstrated in the design of new functional interfaces and membranes, including as platforms for cell culture, the immobilization and synthesis of microarrays of oligonucleotides and proteins, the development of new liquid crystal-based chemical sensors, and as organic solvent-based alternatives to conventional aqueous layer-by-layer processes for the coating and interfacial modification of water-soluble substrates (see Broderick et al., Biomacromolecules 2011, 12(6):1998; Broderick et al., Chemistry of Materials 2012, 24 (5):938; Manna et al., Advanced Materials 2012, 24(31): 4291; Buck et al., Biomacromolecules 2009, 10(6): 1564; Fredin et al., Biomacromolecules 2009, 10 (4):994; Broderick et al., ACS Applied Materials & Interfaces 2013, 5(2): 351; Holden et al., Analytical Chemistry 2015, 87(22): 11420; Kinsinger et al., Langmuir 2008, 24(23): 13231; Manna et al., Angewandte Chemie International Edition 2013, 52(52): 14011; and Guo et al., ACS Applied Materials & Interfaces 2015, 7(48): 26892).

Past work has demonstrated that PEI and PVDMA can also be used to fabricate micrometer thick layer-by-layer films that exhibit nano- and microscale features and substantial nanoscale porosity (Buck et al., Polymer Chemistry 2012, 3(1): 66; and Buck et al., Chemistry of Materials 2010, 22(23): 6319). Those past studies have also demonstrated that these morphologies can impart unique wetting and non-wetting behaviors. For example, when these reactive nanoporous PEI/PVDMA films are functionalized by treatment with hydrophobic amines, the resulting films can become superhydrophobic or extremely non-wetting to aqueous fluids (see Broderick et al., Chemistry of Materials 2012, 24(10): 1786; Manna et al., Advanced Materials 2012, 24 (31): 4291; Buck et al., Chemistry of Materials 2010, 22(23): 6319; Manna et al., Advanced Materials 2013, 25(36): 5104; Manna et al., Advanced Materials 2013, 25(22): 3085; Manna et al., Advanced Materials 2013, 25(44): 6405).

In contrast, when these films are functionalized by treatment with hydrophilic amines, the films become superhydrophilic and can be extremely non-wetting to oils and hydrophobic liquids when submerged in water (coatings that exhibit so-called underwater superoleophobicity) (see Manna et al., Advanced Functional Materials 2015, 25(11): 1672; Carter et al., Chemistry of Materials 2016, 28(14): 5063; and U.S. Pub. No. 2017/0022372). The reactivity of these materials also permits surface and bulk patterning using a variety of chemical methods; this feature has been exploited fruitfully to design surfaces with patterned contrasts in wettability that can guide and manipulate the transport of aqueous fluids (Manna et al., Advanced Materials 2015, 27(19): 3007). The bulk, or internal, superhydrophobicity that can be designed into these three-dimensional nanoporous materials has also been exploited to develop new approaches for the chemical protection and long-term release of encapsulated water-soluble agents, and to design matrices for the fabrication of slippery liquid-infused porous surfaces (SLIPS) that can prevent fouling by aqueous fluids and pathogenic fungi and bacteria (see Manna et al., Advanced Materials 2013, 25(44): 6405; Kratochvil et al., ACS Biomaterials Science & Engineering 2015, 1(10): 1039; Kratochvil et al., ACS Infectious Diseases 2016, 2(7): 509; and Manna et al., Advanced Functional Materials 2016, 26(21): 3599).

The rough, nanoporous, and chemically-reactive morphologies and structures that can develop during the fabrication of PEI/PVDMA films are unique, and have led to novel properties and guiding principles that have enabled new potential applications of these materials. However, while the structures, morphologies, and behaviors of these nanoporous materials have been well characterized, the processes that lead to their development during layer-by-layer assembly, or that can be used to control the extents or the scales on which they occur, remain poorly understood.

Past studies have reported specific process parameters, including fabrication procedures and protocols for the synthesis of PVDMA, that can lead to the evolution of roughness and porosity, and to morphologies that exhibit the physical properties and functional behaviors described above, but thus far no understanding has emerged regarding molecular-level interactions or other physical processes that influence structure formation during assembly (see Manna et al., Advanced Functional Materials 2015, 25 (11): 1672; Buck et al., Chemistry of Materials 2010, 22(23): 6319; Manna et al., Advanced Materials 2013, 25(22): 3085; Manna et al., Advanced Materials 2015, 27(19): 3007; Kratochvil et al., ACS Biomaterials Science & Engineering 2015, 1(10): 1039; Kratochvil et al., ACS Infectious Diseases 2016, 2(7): 509; and Manna et al., Advanced Functional Materials 2016, 26(21): 3599).

SUMMARY OF THE INVENTION

The present invention addresses challenges related to the fabrication of multilayer thin films having controllable combinations of porosity, surface roughness, and chemical reactivity. The present invention describes processes and interactions for the development of micro- and nanoscale structures in polymer-based multilayer films, and molecular design principles that utilize controlled hydrolysis to influence or tune the morphologies of these materials and their functional properties.

In one aspect of the present invention, controlled hydrolysis of functional side chain groups in polymer-based multilayer films is used to obtain desired levels of roughness, porosity, and chemical reactivity. New multilayer films and methods are disclosed that include hydrolyzed azlactones. These groups play a significant role in promoting the generation of porosity and roughness in multilayer films. For example, layer-by-layer assembly using PVDMA synthesized to contain controlled degrees of partial side chain hydrolysis leads to the growth of thick films with substantial nanoscale roughness, porosity, and physicochemical behaviors. By contrast, multilayer thin films without hydrolyzed PVDMA side chains are thinner, smoother, and largely nonporous. Using the methods disclosed herein, the present invention provides for the fabrication of multilayer thin films with controllable combinations of porosity, surface roughness, and chemical reactivity, and offers an additional level of control when developing these materials for specific uses.

Additionally, the present invention allows such multilayer films to be produced with levels of consistency and reproducibility that were not possible using previously disclosed methods, and provides avenues for control and the potential for scalability that would be difficult to achieve or implement using previously disclosed methods. The resulting multilayer films are useful in a broad range of applied contexts, including the design of non-wetting surfaces, reactive polymer coatings, anti-fouling surfaces, and surfaces capable of releasing bioactive compounds.

In an embodiment, the present invention provides a method for fabricating a multilayer film on a substrate, wherein the multilayer film comprises one or more bilayers. The method comprises the steps of:
  a) exposing the surface of the substrate to a first polymer solution wherein a first polymer layer is deposited on at least a portion of the substrate,
    wherein the first polymer solution comprises a portion of unhydrolyzed azlactones having the formula:

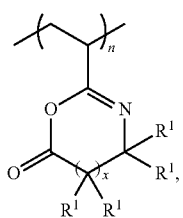

and
the first polymer solution comprises a portion of hydrolyzed azlactones having the formula:

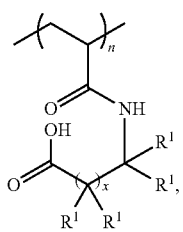

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted; and b) exposing the substrate to a second polymer solution wherein one or more polymers in the second polymer solution covalently react and/or physically interact with the first polymer layer and a second polymer layer is deposited on at least a portion of the first polymer layer, thereby forming a bilayer on the substrate.

Preferably, the first polymer solution is a hydrolyzed or partially hydrolyzed polymer solution comprising a selected percentage of hydrolyzed and unhydrolyzed azlactone groups, which are then deposited on the substrate surface to form the first polymer layer. In an embodiment, the method further comprises the step of hydrolyzing an azlactone polymer solution to generate the first polymer solution having the selected percentage of hydrolyzed and unhydrolyzed azlactone functionalized polymer layer precursors. Alternatively, the first polymer solution may comprise unhydrolyzed or substantially unhydrolyzed azlactone functionalized polymer layer precursors, which are deposited on the substrate surface to form an initial polymer layer and then hydrolyzed to generate the first polymer layer having the desired percentage of hydrolyzed and unhydrolyzed azlactone groups. The hydrolysis of the azlactones may be performed using any chemical method suitable in the art, including, but not limited to reacting the functionalized azlactones with an acid solution.

The first polymer layer may comprise anywhere from 0% to 100% of hydrolyzed functionalized azlactones depending on the desired properties of the multilayer film. However, the extent of hydrolysis will determine the morphology and properties of the resulting multilayer film. For example, the resulting multilayer film will have a varying nanoscale or microscale porosity and roughness depending on the amount of hydrolysis, where increased hydrolysis will generally result in larger porosity and greater roughness.

Additionally, the hydrophobicity of each bilayer may also depend on the amount of hydrolysis. For example, in an embodiment, reacting the residual functional groups in the bilayer with an amine, such n-decylamine, will result in the bilayer being superhydrophobic. However, in an embodiment, if the portion of hydrolyzed functionalized azlactones is less than approximately 10% to 20%, preferably less than approximately 15% to 17%, of the total hydrolyzed and unhydrolyzed functionalized azlactone content, then the resulting the bilayer will be superhydrophobic even without reacting the residual functional groups in the bilayer with the additional amine.

In an embodiment, if the portion of hydrolyzed functionalized azlactones is greater than approximately 25% to 40%, preferably greater than approximately 34% to 36%, of the total hydrolyzed and unhydrolyzed functionalized azlactone content, then the resulting bilayer will not be superhydrophobic even if the residual functional groups in the bilayer are subsequently reacted with the additional amine.

In an embodiment, if the portion of hydrolyzed functionalized azlactones is between approximately 15% to 35%, preferably approximately 17% to 25%, of the total hydrolyzed and unhydrolyzed functionalized azlactone content, then the resulting bilayer will be superhydrophobic unless the residual functional groups in the bilayer are reacted with the additional amine, at which point the bilayer will become superhydrophobic.

In an embodiment, the first polymer layer comprises a hydrolyzed azlactone content between approximately 0% to 20%, between approximately 0% to 15%, between approximately 0% to 10%, between approximately 10% to 20%, between approximately 10% to 15%, between approximately 15% to 40%, between approximately 15% to 35%, between approximately 15% to 30%, between approximately 15% to 25%, between approximately 15% to 20%, between approximately 20% to 35%, between approximately 20% to 30%, between approximately 25% to 40%, between approximately 25% to 35%, between approximately 25% to 30%, between approximately 30% to 50%, between approximately 30% to 40%, between approximately 30% to 35%, between approximately 35% to 60%, between approximately 35% to 50%, between approximately 35% to 40%, between approximately 40% to 75%, between approximately 40% to 60%, or between approximately 50% to 90% of the total hydrolyzed and unhydrolyzed functionalized azlactone content.

Preferably, steps a) and b) are repeated one or more times until the multilayer film reaches the desired thickness or desired number of layers, where each cycle deposits a new bilayer on the substrate. In specific embodiments, the multilayer polymer film comprises more than one bilayer. In a further embodiment, steps a) and b) are repeated 2 or more times, 5 or more times, 10 or more times, 20 or more times, 30 or more times, 50 or more times, or 100 or more times. The substrate can be exposed to the solutions containing the polymer solutions using methods known in the art, including but not limited to, dip coating. If an additional hydrolyzing step is performed on polymer layers already deposited on the substrate, the hydrolyzing step may also be repeated one or more times similar to the other steps.

The method optionally comprises a rinsing step comprising exposing or washing the substrate with a rinse solvent or solution each time a step is performed. In an embodiment, a fresh rinse solvent or solution is employed for each rinsing step. In a further embodiment, the same rinse solution is re-used for each rinsing step.

The substrate can be any material able to support the formation of the nanoporous or microporous multilayer film, including but not limited to glass, metals and plastics. The substrate can include curved and irregularly shaped three-dimensional surfaces, as well as completely solid surfaces and mesh surfaces (e.g., having a porosity between 100 μm and 250 μm).

In an embodiment, the present invention provides a multilayer film comprising one or more bilayers, wherein each bilayer comprises a first polymer layer covalently linked with a second polymer layer. The first polymer layer comprises a portion of unhydrolyzed functionalized azlactones having the formula:

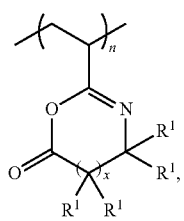

and also comprises a portion of hydrolyzed functionalized azlactones having the formula:

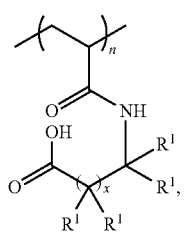

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted.

In an embodiment, the portion of hydrolyzed functionalized azlactones is approximately 17% or less of the total hydrolyzed and unhydrolyzed functionalized azlactone content and results in the bilayer being superhydrophobic. In another embodiment, the portion of hydrolyzed functionalized azlactones is approximately 36% or greater of the total hydrolyzed and unhydrolyzed functionalized azlactone content and results in the bilayer not being superhydrophobic. In another embodiment, the portion of hydrolyzed functionalized azlactones is between approximately 17% and 25% of the total hydrolyzed and unhydrolyzed functionalized azlactone content and results in the bilayer not being superhydrophobic unless the bilayer is further reacted with an amine, such as a hydrophobic amine. Suitable amines include, but are not limited to, n-propylamine, n-octylamine, n-decylamine, and combinations thereof.

The first and second polymer layers of the bilayer can comprise any polymers or combination of polymers able to form a stable bilayer and where the first polymer layer is optionally able to be functionalized and the second polymer layer is optionally also able to be functionalized (as described in U.S. Pat. No. 8,071,210). Preferably, the first polymer layer is covalently cross-linked with the second polymer layer. In further embodiments, the bilayers are reacted with small chemical groups containing a hydrophobic or hydrophilic amine to further functionalize the bilayer (i.e., to install secondary surface functionality).

Useful functionalized azlactone polymers include, but are not limited to, poly(2-vinyl-4,4-dimethylazlactone), poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethylene-2-oxazolin-5-one), poly (2-vinyl-4-methyl-4-phenyl-2-oxazolin-5-one), poly(2-isopropenyl-4-benzyl-4-methyl-2-oxazolin-5-one), or poly (2-vinyl-4,4-dimethyl-1,3-oxazin-6-one). Useful azlactone functionalized polymers further include azlactone functionalized polyisoprenes, azlactone functionalized polybutadienes, and copolymers formed by copolymerization of VDMA with other vinyl monomers. The first polymer layer may also comprise one or more copolymers. The one or more copolymers can include any copolymer compatible with the azlactone containing polymer in the first polymer layer, including but not limited to an acrylate polymer, methacrylate polymer, styrene polymer, vinyl polymer, and combinations thereof. In a further embodiment, the azlactone polymer is synthesized by free-radical polymerization of intentionally added cyclic azlactone-functionalized oligomer in an amount ranging from 1 wt % to 10 wt %, preferably between 5 wt % and 8 wt %.

In an embodiment, the second polymer layer of the bilayer is optionally functionalized and comprises an amine-functionalized polymer, an alcohol functionalized polymer, or a thiol-functionalized polymer. Creating specific functionalities with amine, alcohol, and thiol groups is a process well known in the art (for example, see *Bioconjugate Techniques*, $2^{nd}$ Edition, 2008, Greg T. Hermanson). In embodiments, the second polymer layer comprises an optionally functionalized polymer selected from the group consisting of poly (ethylene imine) (PEI), polylysine, polyallylamine, poly (amidoamine) dendrimers, polyvinyl alcohol, poly hydroxyl ethyl methacrylate, poly(methacrylic acid) functionalized with cystamine, and linear and hyperbranched and dendritic polymers functionalized with primary amines, hydroxyl groups, or thiol groups.

In embodiments, the second polymer layer comprises a polymer, which is optionally functionalized, selected from the group consisting of polyolefins, poly(alkyls), poly(alkenyls), poly(ethers), poly(esters), poly(imides), polyamides, poly(aryls), poly(heterocycles), poly(ethylene imines), poly (urethanes), poly(α,β-unsaturated carboxylic acids), poly(α, β-unsaturated carboxylic acid derivatives), poly(vinyl esters of carboxylic acids), poly(vinyl halides), poly(vinyl alkyl ethers), poly(N-vinyl compounds), poly(vinyl ketones), poly (vinyl aldehydes) and any combination thereof. In an embodiment, the second polymer layer comprises poly (ethylene imine) (PEI). In a further embodiment, the first polymer layer comprises PVDMA and the second polymer layer comprises poly(ethylenimine) (PEI).

"Functionalized polymer" refers to a polymer in which at least a portion of the individual monomer units are substituted with a specific functional group. For the functionalized polymers of the present invention, at least 1% or more, at least 2% or more, at least 5% or more, at least 10% or more, at least 15% or more, at least 20% or more, at least 30% or more, at least 50% or more, at least 75% or more, or at least 90% or more of the portion of the monomer units is substituted with a specific functional group.

For some embodiments, it may be desirable to further functionalize a portion of the one or more bilayers. This can be achieved, for example, by reacting a portion of any residual functional groups in the one or more bilayers with an amine group, hydroxyl group, thiol group or hydrazine, or by reacting a portion of the first or second polymer with an amine reactive group or hydroxyl reactive group.

In an embodiment, at least a portion of the residual functional groups in the bilayer is reacted such as generally described in Scheme 1 below with an amine, hydroxyl group, thiol group, or hydrazine group having the formula R—$NH_2$, R—OH, R—SH or R—$NHNH_2$, where R is hydrophobic or hydrophilic (it should be noted that the residual functional groups are not limited to azlactone groups).

ethanethiol, propanethiol, butanethiol, pentanethiol, hexanethiol, heptanethiol, octanethiol, nonanethiol, decanethiol, and combinations thereof. In an embodiment, at least a portion of the residual functional groups in the bilayer is reacted with an amino sugar, amino alcohol, amino polyol, glucamine (preferably D-glucamine), dimethylaminopropylamine (DMAPA), or combinations thereof. In other embodiments, at least a portion of the residual functional groups in the bilayer is reacted with a hydrazine group to form an acylhydrazine group.

In an embodiment, the polymer of the first polymer layer is further functionalized with a hydrophobic (decylamine or propylamine) or hydrophilic (glucamine) primary amine-containing small molecule.

Scheme 1

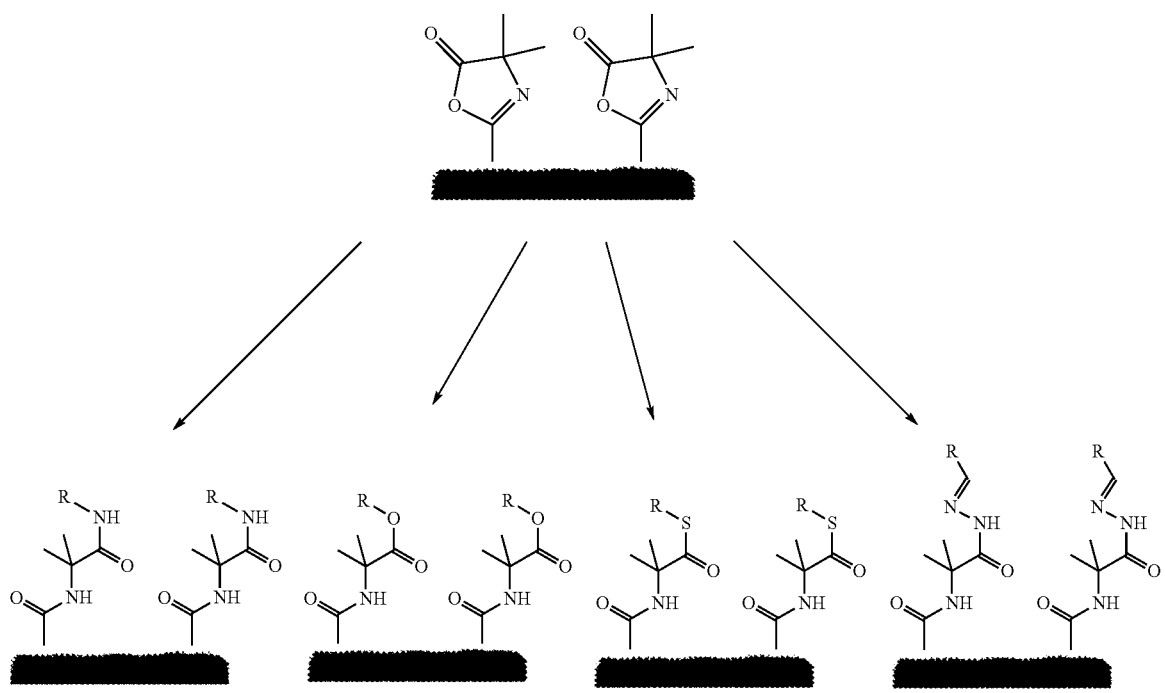

In embodiments, R is a substituted or unsubstituted $C_1$ to $C_{20}$ alkyl group, preferably a $C_1$ to $C_{12}$ alkyl group. In other embodiments, R is a substituted or unsubstituted $C_2$ to $C_{20}$ alkenyl group, preferably a $C_2$ to $C_{12}$ alkenyl group. In further embodiments, at least a portion of the residual functional groups in the bilayer is reacted with an amine selected from the group consisting of methylamine, ethylamine, propylamine, butylamine, pentylamine, hexylamine, heptylamine, octylamine, nonylamine, decylamine, and combinations thereof, preferably n-propylamine, n-octylamine, or n-decylamine. In other embodiments, R is an alkyl group substituted with one or more hydroxyl groups or charged groups such as $COO^-$ or $NR3^+$. In further embodiments, at least a portion of the residual functional groups in the bilayer is reacted with an alcohol selected from the group consisting of methanol, ethanol, propanol, butanol, pentanol, hexanol, heptanol, octanol, nonanol, decanol, and combinations thereof. In further embodiments, at least a portion of the residual functional groups in the bilayer is reacted with a thiol selected from the group consisting of methanethiol, In a further embodiment, at least a portion of the residual functional groups in the bilayer is reacted to form multilayer films with chemically labile amide/ester-, amide/thioester-, and amide/imine-type bonds. These chemically labile bonds are able to be broken, such as through additional hydrolysis, in order to undergo stimuli-responsive and reversible changes in wetting behaviors.

One aspect of the invention provides thin multilayer polymer films and coatings (e.g., equal to or less than 100 μm, equal to or less than 50 μm, preferably less than or equal to 10 μm, preferably less than or equal to 5 μm). Preferably, the multilayer film comprises 2 or more bilayers, 5 or more bilayers, 10 or more bilayers, 20 or more bilayers, 30 or more bilayers, 50 or more bilayers, or 100 or more bilayers. Preferably, each first polymer layer alternates with the second polymer layer. In embodiments, the multilayer films have a nanoscale or microscale porosity.

In a further embodiment, the multilayer film further comprises an oil able to coat and partially fill the pores of at least a portion of the multilayer film, thereby forming a slippery liquid-infused porous surface (SLIPS) multilayer film. SLIPS are an emerging class of bio-inspired soft matter that exhibits unique and robust antifouling behavior (see U.S. Pub. No. 2017/0022371). SLIPS materials are fabricated by infusion of viscous oils into porous surfaces, yielding interfaces that allow other fluids to slide off (e.g., with sliding angles as low as 2°). Surfaces and coatings that exhibit these characteristics have enabled the design of new anti-icing surfaces, slippery containers for the dispensing of commercial liquids and gels, and new liquid-infused interfaces that are resistant to biofouling in complex aqueous, biological, and marine environments.

Many different approaches have been used to design substrates, coat surfaces, and functionalize interfaces with combinations of porosity, roughness, and surface chemistry that lead to slippery surfaces when infused with different oils and liquid phases (see Wong et al., Nature, 2011, 477: 443-447). The present invention provides greater flexibility for the fabrication of SLIPS on complex surfaces and increases the ability to tune, pattern, or manipulate the interfacial properties of these liquid-infused materials.

As used herein, "an oil" refers to a non-polar, hydrophobic chemical substance which is a liquid at ambient temperature and which has no or very low solubility in water. Preferably, the oil infused into the one or more bilayers is selected from the group consisting of a silicone oil, a vegetable oil, a mineral oil, a thermotropic liquid crystal, and combinations thereof. Suitable vegetable oils include, but are not limited to, canola oil, coconut oil, olive oil, soybean oil and combinations thereof. The infusion of the oil into at least a portion of the rough or porous surfaces of the multilayer film causes other liquids placed in contact with the multilayer film to slide off the multilayer film or a surface coated with the multilayer film. Altering the porosity of the multilayer film through the hydrolysis of the azlactone groups will therefore alter how easily the oil can infuse into the film and therefore the slipperiness of the film.

BRIEF DESCRIPTION OF THE DRAWINGS

FIG. 9. Gel permeation chromatography (GPC) traces for (black) P1 and (blue) $P1_X$. The near overlap in the traces indicate that the molecular weight and dispersity index of each polymer is similar.

DETAILED DESCRIPTION OF THE INVENTION

Definitions

Figure 1:
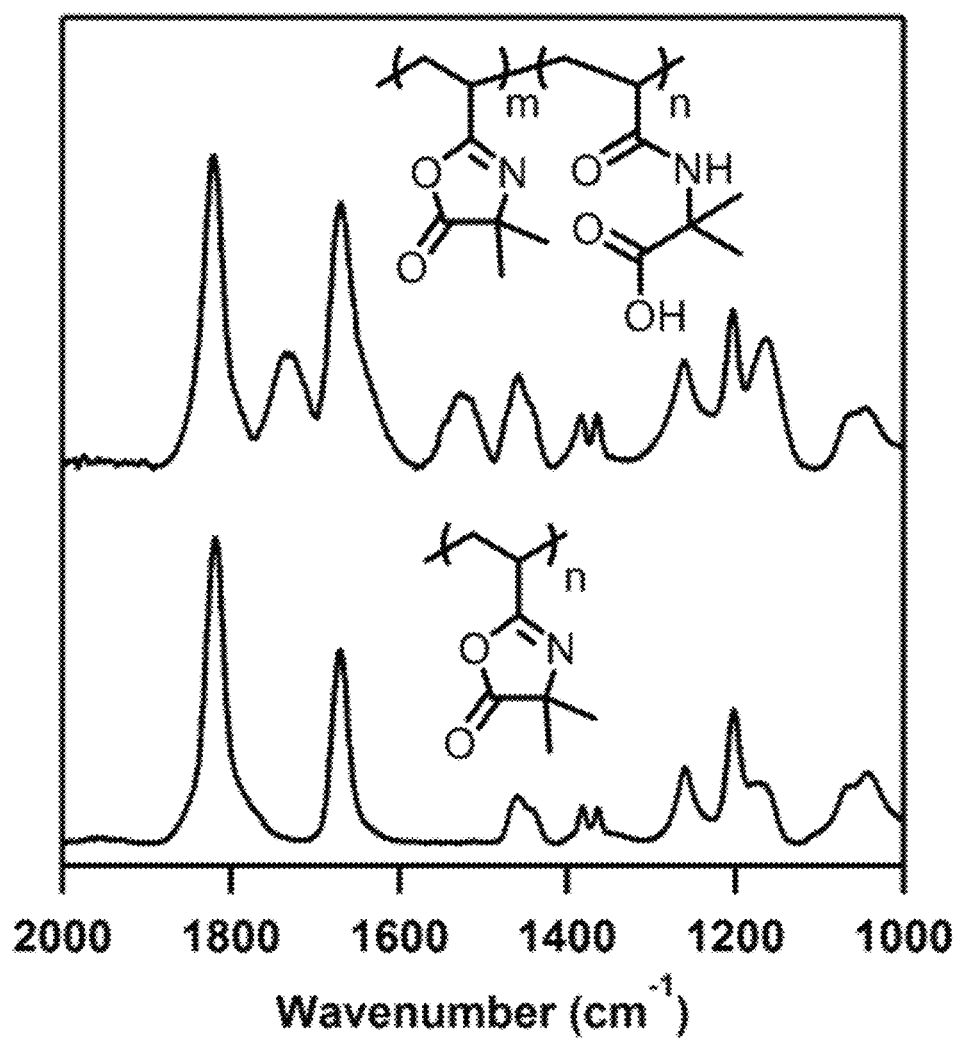
FIG. 1. ATR IR spectra for P1 (bottom) and partially hydrolyzed $P1_X$, (top). The peaks corresponding to the azlactone carbonyl (C=O, 1818 cm$^{-1}$) and azlactone imine (C=N, 1671 cm$^{-1}$) stretches are observed in the spectra of both P1 and $P1_X$. Carboxylic acid carbonyl stretching (C=O, 1734 cm$^{-1}$) and amide bending (N—H, 1528 cm$^{-1}$) peaks associated with hydrolyzed azlactone rings are present in the spectrum of $P1_X$ only.

An "amine reactive group" or "hydroxyl; reactive group" can be any functional group able to react with an amine group or hydroxyl group, respectively.

As used herein, the term "anti-fouling" refers to a material's ability to resist adhesion by an undesirable material, such as oils, organic compounds, and organisms. In particular, it is desirable to prevent or reduce the adhesion of hydrophobic compounds and organisms to a material which is submerged or in contact with water.

As used herein, the terms "wetting", "wettability" and "non-wetting" refer to the ability of a liquid to maintain contact with a solid surface. A drop of a liquid will tend to spread out over a flat, solid surface when brought into contact with air or another liquid. For a surface having high wettability, the fluid will spread over a large area of the surface, while surfaces having non-wetting surfaces will result in the fluid minimizing contact with the surface and forming a compact liquid droplet. The degree of wetting or non-wetting can be measured by measuring the contact angle ($\theta$) (i.e., the angle at which the liquid-vapor interface meets the solid-liquid interface). As used herein, a contact angle ($\theta$) of a drop of liquid on the flat, solid surface less than or equal to 90° indicates that a surface has high wettability, while a contact angle ($\theta$) between 90° and 180° indicates that a surface is non-wetting. As used herein, a contact angle of greater than or equal to 150° indicates that a surface is "extremely non-wetting". As used herein, the term "superoleophobicity" refers to a material which produces a contact angle of greater than or equal to 150° for a drop of a hydrophobic oil. As used herein, "superhydrophobicity" refers to a surface with a contact angle >150° and a contact angle hysteresis, or roll-off angle, of <10°) (see Wang et al., Chemical Reviews 2015, 115(16): 8230; and Wen et al., Angewandte Chemie-International Edition 2015, 54(11): 3387).

As used herein, the term "approximately" when used with a percentage value is meant to encompass the given value±10%, ±5%, ±4%, ±3%, ±2% or ±1%.

As used herein the term "attached" includes both covalent and non-covalent binding.

The term "nanoscale" refers to a length less than 1,000 nm, preferably less than 100 nm, and the term "microscale" refers to a length less than 1,000 µm, preferably less than 100 µm.

The term "alkyl" refers to a monoradical of a branched or unbranched (straight-chain or linear) saturated hydrocarbon and to cycloalkyl groups having one or more rings. Alkyl groups as used herein include those having from 1 to 20 carbon atoms, preferably having from 1 to 12 carbon atoms. Alkyl groups include small alkyl groups having 1 to 3 carbon atoms. Alkyl groups include medium length alkyl groups having from 4-10 carbon atoms. Alkyl groups include long alkyl groups having more than 10 carbon atoms, particularly those having 10-20 carbon atoms. Cycloalkyl groups include those having one or more rings. Cyclic alkyl groups include those having a 3-, 4-, 5-, 6-, 7-, 8-, 9-, 10-, 11- or 12-member carbon ring and particularly those having a 3-, 4-, 5-, 6-, or 7-member ring. The carbon rings in cyclic alkyl groups can also carry alkyl groups. Cyclic alkyl groups can include bicyclic and tricyclic alkyl groups. Alkyl groups are optionally substituted. Substituted alkyl groups include among others those which are substituted with aryl groups, which in turn can be optionally substituted. Specific alkyl groups include methyl, ethyl, n-propyl, iso-propyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Substituted alkyl groups include fully halogenated or semihalogenated alkyl groups, such as alkyl groups having one or more hydrogens replaced with one or more fluorine atoms, chlorine atoms, bromine atoms and/or iodine atoms. Substituted alkyl groups include fully fluorinated or semifluorinated alkyl groups, such as alkyl groups having one or more hydrogens replaced with one or more fluorine atoms. An alkoxy group is an alkyl group linked to oxygen and can be represented by the formula R—O. Examples of alkoxy groups include, but are not limited to, methoxy, ethoxy, propoxy, butoxy and heptoxy. Alkoxy groups include substituted alkoxy groups wherein the alky portion of the groups is substituted as provided herein in connection with the description of alkyl groups.

The term "alkenyl" refers to a monoradical of a branched or unbranched unsaturated hydrocarbon group having one or more double bonds and to cycloalkenyl groups having one or more rings wherein at least one ring contains a double bond. Alkenyl groups include those having 1, 2 or more double bonds and those in which two or more of the double bonds are conjugated double bonds. Alkenyl groups include those having from 2 to 20 carbon atoms, preferably having from 2 to 12 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those having one or more rings. Cyclic alkenyl groups include those in which a double bond is in the ring or in an alkenyl group attached to a ring. Cyclic alkenyl groups include those having a 3-, 4-, 5-, 6-, 7-, 8-, 9-, 10-, 11- or 12-member carbon ring and particularly those having a 3-, 4-, 5-, 6- or 7-member ring. The carbon rings in cyclic alkenyl groups can also carry alkyl groups. Cyclic alkenyl groups can include bicyclic and tricyclic alkyl groups. Alkenyl groups are optionally substituted. Substituted alkenyl groups include among others those which are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1-enyl, hex-1-enyl, branched hexenyl, cyclohexenyl, all of which are optionally substituted. Substituted alkenyl groups include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogens replaced with one or more fluorine atoms.

The term "aryl" refers to a chemical group having one or more 5-, 6- or 7-member aromatic or heterocyclic aromatic rings. An aromatic hydrocarbon is a hydrocarbon with a conjugated cyclic molecular structure. Aryl groups include those having from 4 to 30 carbon atoms, preferably having from 6 to 18 carbon atoms. Aryl groups can contain a single ring (e.g., phenyl), one or more rings (e.g., biphenyl) or multiple condensed (fused) rings, wherein at least one ring is aromatic (e.g., naphthyl, dihydrophenanthrenyl, fluorenyl, or anthryl). Heterocyclic aromatic rings can include one or more N, O, or S atoms in the ring. Heterocyclic aromatic rings can include those with one, two or three N, those with one or two O, and those with one or two S, or combinations of one or two or three N, O or S. Aryl groups are optionally substituted. Substituted aryl groups include among others those which are substituted with alkyl or alkenyl groups, which groups in turn can be optionally substituted. Specific aryl groups include phenyl groups, biphenyl groups, pyridinyl groups, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocylic aromatic group-containing groups corresponding to any one of the following benzene, naphthalene, naphthoquinone, diphenylmethane, fluorene, fluoranthene, anthracene, anthraquinone, phenanthrene, tetracene, naphthacenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic radical, including monovalent, divalent and polyvalent radicals, of the aromatic and heterocyclic aromatic groups listed above provided in a covalently bonded configuration in the compounds of the present invention. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl having one or more hydrogens replaced with one or more fluorine atoms, chlorine atoms, bromine atoms and/or iodine atoms.

Optional substitution of any alkyl, alkenyl and aryl groups includes substitution with one or more of the following substituents: halogens, —CN, —COOR, —OR, —COR, —OCOOR, —CON(R)$_2$, —OCON(R)$_2$, —N(R)$_2$, —NO$_2$, —SR, —SO$_2$R, —SO$_2$N(R)$_2$ or —SOR groups. Optional substitution of alkyl groups includes substitution with one or more alkenyl groups, aryl groups or both, wherein the alkenyl groups or aryl groups are optionally substituted. Optional substitution of alkenyl groups includes substitution with one or more alkyl groups, aryl groups, or both, wherein the alkyl groups or aryl groups are optionally substituted. Optional substitution of aryl groups includes substitution of the aryl ring with one or more alkyl groups, alkenyl groups, or both, wherein the alkyl groups or alkenyl groups are optionally substituted.

Optional substituents for alkyl and alkenyl groups include among others:
—COOR where R is a hydrogen or an alkyl group or an aryl group and more specifically where R is methyl, ethyl, propyl, butyl, or phenyl groups all of which are optionally substituted;
—COR where R is a hydrogen, or an alkyl group or an aryl groups and more specifically where R is methyl, ethyl, propyl, butyl, or phenyl groups all of which groups are optionally substituted;
—CON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;
—OCON(R)$_2$ where each R, independently of each other R, is a hydrogen or an alkyl group or an aryl group and more specifically where R is methyl, ethyl, propyl, butyl, or phenyl groups all of which groups are optionally substituted; R and R can form a ring which may contain one or more double bonds;
—N(R)$_2$ where each R, independently of each other R, is an alkyl group, acyl group or an aryl group and more specifically where R is methyl, ethyl, propyl, butyl, or phenyl or acetyl groups all of which are optionally substituted; or R and R can form a ring which may contain one or more double bonds.
—SR, —SO$_2$R, or —SOR where R is an alkyl group or an aryl groups and more specifically where R is methyl, ethyl, propyl, butyl, phenyl groups all of which are optionally substituted; for —SR, R can be hydrogen;
—OCOOR where R is an alkyl group or an aryl groups;
—SO$_2$N(R)$_2$ where R is a hydrogen, an alkyl group, or an aryl group and R and R can form a ring;
—OR where R is H, alkyl, aryl, or acyl; for example, R can be an acyl yielding —OCOR* where R* is a hydrogen or an alkyl group or an aryl group and more specifically where R* is methyl, ethyl, propyl, butyl, or phenyl groups all of which groups are optionally substituted.

As used herein, the term "alkylene" refers to a divalent radical derived from an alkyl group or as defined herein. Alkylene groups in some embodiments function as attaching and/or spacer groups in the present compositions. Compounds of the present invention include substituted and unsubstituted $C_1$-$C_{30}$ alkylene, $C_1$-$C_{12}$ alkylene and $C_1$-$C_5$ alkylene groups. The term "alkylene" includes cycloalkylene and non-cyclic alkylene groups.

As used herein, the term "cycloalkylene" refers to a divalent radical derived from a cycloalkyl group as defined herein. Cycloalkylene groups in some embodiments function as attaching and/or spacer groups in the present compositions. Compounds of the present invention include substituted and unsubstituted $C_1$-$C_{30}$ cycloalkenylene, $C_1$-$C_{12}$ cycloalkenylene and $C_1$-$C_5$ cycloalkenylene groups.

As used herein, the term "alkenylene" refers to a divalent radical derived from an alkenyl group as defined herein. Alkenylene groups in some embodiments function as attaching and/or spacer groups in the present compositions. Compounds of the present invention include substituted and unsubstituted $C_1$-$C_{20}$ alkenylene, $C_1$-$C_{12}$ alkenylene and $C_1$-$C_5$ alkenylene groups. The term "alkenylene" includes cycloalkenylene and non-cyclic alkenylene groups.

As used herein, the term "cycloalkenylene" refers to a divalent radical derived from a cylcoalkenyl group as defined herein. Cycloalkenylene groups in some embodiments function as attaching and/or spacer groups in the present compositions.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO-substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups, and methoxyphenyl groups, particularly 4-methoxyphenyl groups.

As used herein, the term "halo" refers to a halogen group such as a fluoro (—F), chloro (—Cl), bromo (—Br) or iodo (—I).

As to any of the above groups which contain one or more substituents, it is understood, that such groups do not contain any substitution or substitution patterns which are sterically impractical and/or synthetically non-feasible. In addition, the compounds of this invention include all stereochemical isomers arising from the substitution of these compounds.

Overview

The methods of the present invention allow for the fabrication of thin films with combinations of porosity, surface roughness, and chemical reactivity that are useful in a broad range of applied contexts, including the design of non-wetting surfaces, anti-fouling surfaces, and nano/bio-interfaces.

In an aspect of the invention, the presence of hydrolyzed azlactone groups in polymer-based multilayer films play a significant role in promoting the generation of porosity and roughness. For example, whereas the layer-by-layer assembly of PVDMA and PEI leads to the linear growth of thin, smooth films that are largely devoid of notable nanoscale features, layer-by-layer assembly using PVDMA synthesized to contain controlled degrees of partial side chain hydrolysis leads to the growth of thick films with substantial nanoscale roughness, porosity, and physicochemical behaviors similar to those reported in past studies. Because the hydrolysis of azlactone functionality leads to the formation of carboxylic acid side chain groups, nanostructure formation may be influenced or driven in part by acid/base ion-pairing interactions and/or hydrogen-bonding interactions with PEI during reactive layer-by-layer assembly. Accordingly, hydrolysis of azlactone and other side chain functional groups provides a framework for understanding and exploiting the range of competing interactions that control film growth and lead to changes in film morphology in a reactive layer-by-layer system. The embodiments described herein provide insights, guiding principles, and new experimental tools useful in further tuning and tailoring the properties and behaviors of these reactive coatings.

It is to be understood that this invention is not limited to only the specific methodology, protocols, subjects, or reagents described, and as such may vary. It is also to be understood that the terminology used herein is for the purpose of describing particular embodiments only, and is not intended to limit the scope of the present invention, which is limited only by the claims. The following examples are offered to illustrate, but not to limit the claimed invention.

Example 1—Fabrication of Hydrolyzed PEI/PVDMA Multilayer Films

Materials. Branched poly(ethyleneimine) (PEI; MW ~25,000), azobisisobutyronitrile (AIBN, recrystallized once from methanol), decylamine (95%+), concentrated hydrochloric acid (HCl, 37%, ACS reagent), tetrahydrofuran (THF, HPLC grade, >99.9%), dichloromethane (DCM, ACS grade), and hexanes (technical grade), were purchased from Sigma-Aldrich (Milwaukee, Wis.). Inhibitor Removal Resin was purchased from Alfa Aesar (Radnor, Pa.). 2-Vinyl-4,4-dimethylazlactone (VDMA) was fractionally distilled under vacuum (B.P. ~22° C. at ~500 mTorr; clear mobile liquid at room temperature). The middle distillation fraction was collected as a clear, non-viscous, colorless oil. Butylated hydroxytoluene (BHT, 500 ppm) and triethylamine ($NEt_3$, 1000 ppm) were added, and the monomer was stored as a crystalline solid under refrigeration prior to use. Water with a resistivity of 18.2 MΩ·cm was obtained from a Millipore filtration system. Unless otherwise noted, materials were used as received.

Figure 9:
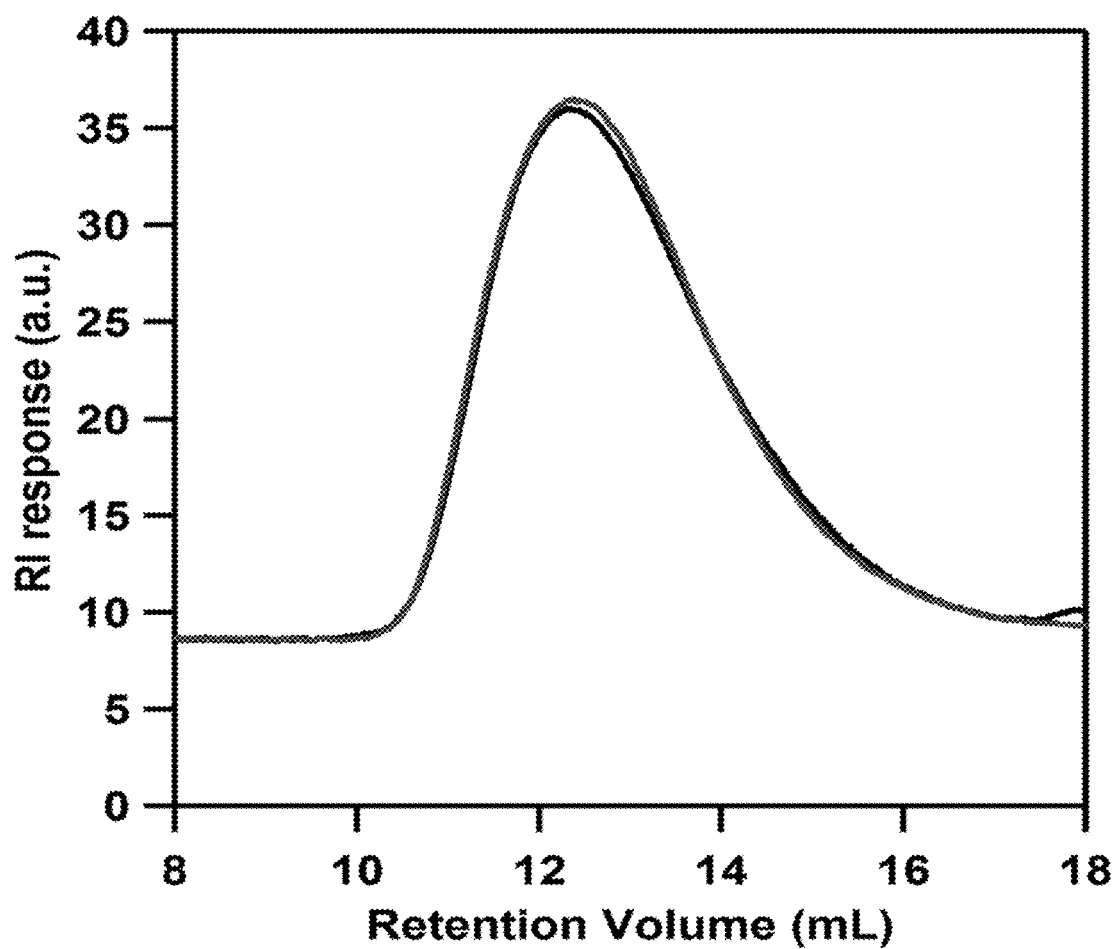

General Considerations. $^1$H NMR spectroscopy of VDMA and P1 or $P1_X$ derivatives was performed in $CDCl_3$ using a Bruker Avance-500 spectrometer. $P1_X$ refers to a P1 polymer that is partially hydrolyzed, where x is a letter defined below indicating the degree of hydrolysis (from $P1_A$ to $P1_D$). A relaxation delay of 10 seconds was used for the polymers and all spectra were referenced relative to the residual proton peak of $CHCl_3$ (δ 7.26 ppm). Gel permeation chromatography was performed using a Viscotek GPC Max VE2001 equipped with two Polymer Laboratories PolyPore columns (250 mm×4.6 mm) and a TDA-302 detector array using THF as the eluent at a flow rate of 1 mL/min at 40° C. The instrument was calibrated using 10 narrow dispersity polystyrene standards with $M_n$=0.580-377.4 kg/mol (Agilent Technologies, Santa Clara, Calif.). Attenuated total reflectance (ATR) IR measurements were obtained using a Bruker Tensor 27 FTIR spectrometer outfitted with a Pike Technologies Diamond ATR stage (Madison, Wis.). Data were analyzed using Opus Software version 6.5 (Bruker Optik GmbH). Spectra were collected at a resolution of 2 $cm^{-1}$ and are presented as an average of 16 scans. Data were smoothed by applying a nine-point average and baseline-corrected using a concave rubberband correction (10 iterations, 64 points). Optical thicknesses of films deposited on silicon substrates were determined using a Gaertner LSE ellipsometer (632.8 nm, incident angle=70°) and data were processed using the Gaertner ellipsometer measurement software. Thicknesses were calculated assuming a refractive index of 1.577, and were determined in at least five different locations for three replicate films. All films were dried under a stream of filtered compressed air prior to thickness measurements. Contact angle measurements were made using a Dataphysics OCA 15 Plus contact angle goniometer at ambient temperature with 4 μL of 18.2 MO Millipore water in at least 3 different locations on each film. Scanning electron micrographs were acquired using a LEO-1550 VP field-emission SEM operating with an accelerating voltage of 1 kV. Film samples were coated with a thin layer of gold prior to imaging; polymer and rinse solutions on silicon chips were imaged without gold coating. Digital pictures were acquired using a Canon PowerShot SX130 IS digital camera. Compressed air used to dry samples was filtered through a 0.2 μm membrane syringe filter Synthesis of Poly(2-Vinyl-4,4-Dimethylazlactone) (PVDMA) [Polymer P1]. The following general procedure yields unhydrolyzed PVDMA when freshly distilled monomer is used. VDMA was first passed through two Pasteur pipet columns of Inhibitor Removal Resin (~3.5 cm height) followed by a Pasteur pipet column of silica gel (~2 cm height) to remove BHT and $NEt_3$, respectively. VDMA (2.05 g, 14.8 mmol), AIBN (24.37 mg, 0.148 mmol), and ethyl acetate (6.0 mL, dried over $MgSO_4$ and subsequently filtered through a 0.2 μm PTFE syringe filter) were added to an oven-dried 25 mL round-bottomed flask tube, sealed with a rubber septum and parafilm, and sparged with nitrogen for 15 minutes before being placed into an oil bath at 60° C. After 24 hours, the flask was cooled to room temperature and the mixture was diluted with ~4 mL of DCM and precipitated into ~300 mL of hexanes. The resulting white solid was collected by vacuum filtration and then dried under high vacuum to constant weight to give P1. $^1$H NMR (400.180 MHz, CDCl$_3$, δ ppm): 2.71 (s, 1H), 2.16-1.79 (m, 2H), 1.37 (s, 6H). ATR IR (cm$^{-1}$): 1818 (C=O azlactone), 1671 (C=N azlactone), 1203 C—O—C (azlactone). See also FIG. 1 (panel B) and FIG. 9.

Partial Hydrolysis of PVDMA. Polymer P1 was partially hydrolyzed to different degrees to yield P1$_X$ using the following general procedure. A sample of P1 (~35 mg) was weighed into a threaded 6 mL glass vial with a stir bar and dissolved in 0.75 mL THF to give a clear, non-viscous solution at room temperature. A 0.1 M HCl solution in THF/H$_2$O was freshly prepared by adding 82.1 μL of concentrated HCl (37 wt %) to 9.918 mL of THF using a volumetric pipet (in this solution, [H$_2$O]=0.344 mol/L). A pre-determined volume of this solution targeting a specific degree of azlactone hydrolysis was added, with vigorous stirring, to the vial containing the P1 solution using a volumetric pipet. The mixture turned bright yellow immediately after addition of the acidic solution, and the vial was sealed with a Teflon cap and parafilm and left to stir overnight at room temperature. The yellow color generally dissipated after several hours, but often persisted for samples with higher intended degrees of azlactone hydrolysis (e.g., 20% or greater). The polymer was precipitated into ~15 mL of hexanes at room temperature, the solids were allowed to settle, and the solvent was removed by pipet. The resulting P1$_X$ derivatives were dried under high vacuum overnight to yield white solids. HPLC grade THF solvent was used for this procedure and was not necessarily anhydrous; the actual degree of hydrolysis was therefore often higher than the targeted degree of hydrolysis. The final degrees of hydrolysis for P1$_X$ derivatives were determined using quantitative $^{13}$C NMR spectroscopy as described in the next section and are presented in Table 1.

Characterization of Degrees of Hydrolysis of PVDMA by Quantitative $^{13}$C NMR Spectroscopy. Quantitative $^{13}$C{$^1$H} NMR spectroscopy was performed using a Bruker Avance3 spectrometer with a liquid He-cooled DCH cryoprobe. Samples were dissolved at ~2 wt % in deuterated acetone (acetone-d$_6$) and all spectra were referenced relative to the residual carbon peak of the carbonyl carbon in acetone-d$_6$ (δ206.26 ppm). Acquisition parameters were adapted from the literature (Gardner et al., Macromolecules 2011, 44 (18): 7115) and are as follows: PULPROG=zgig30, D1=10 s, AQ=1.1 s, SW=237 ppm, O1P=100 ppm, NS=1024, DS=4, LB=1. Prior knowledge of T1($^{13}$C), permits the acquisition of quantitative data.

Layer-by-Layer Assembly of PEI/P1 and PEI/P1$_X$ Coatings. Multilayers of PEI/P1 or PEI/P1$_X$ were fabricated on glass or silicon substrates (~1×4 cm, five total substrates for each condition; pre-cleaned with methanol and acetone) using a general procedure reported in past studies for the fabrication of nanoporous PEI/PVDMA films: (i) substrates were submerged in a solution of PEI (~0.87 mg/mL; 20 mM in acetone with respect to the polymer repeat unit) for 20 s; (ii) substrates were removed and immersed in an initial acetone bath for 20 s, followed by a second acetone bath for 20 s; (iii) substrates were submerged in a solution of P1 or P1$_X$ (~2.8 mg/mL; 20 mM in acetone with respect to the polymer repeat unit for P1, ~3.1 mg/mL for P1$_X$) for 20 s; and (iv) substrates were removed and rinsed again using the procedure outlined under step (ii) (see Carter et al., Chemistry of Materials 2016, 28 (14): 5063; Manna et al., Advanced Materials 2015, 27 (19): 3007; and Kratochvil et al., ACS Infectious Diseases 2016, 2 (7): 509)).

This cycle was repeated 35 times, without changing the rinse solutions to yield films 35 bilayers thick. After fabrication, films were washed copiously with acetone from a spray bottle and then dried under a stream of compressed air. Films were stored in a vacuum desiccator prior to use. To functionalize residual azlactone groups with decylamine, films were incubated overnight in solutions of decylamine (20 mg/mL) in THF at room temperature (see Manna et al., Advanced Materials 2012, 24 (31): 4291; Buck et al., Chemistry of Materials 2010, 22 (23): 6319; Manna et al., Advanced Materials 2015, 27 (19): 3007; and Manna et al., ACS Applied Materials & Interfaces 2013, 5 (16): 7731). After incubation, films were rinsed with THF and then dried under a stream of compressed air.

Characterization of Polymer Aggregates Formed During Film Fabrication. In experiments designed to characterize the presence of polymer aggregates in the polymer dipping solutions and the rinse solutions used for film fabrication, multilayer films were assembled using the above procedure and a model Pix polymer containing 22.5±1.4% hydrolyzed side chain groups. After film fabrication, two drops of solution from each polymer solution vial (PEI and P1$_X$) were placed onto silicon substrates, the acetone was allowed to evaporate at room temperature, and the remaining material was imaged by SEM. In separate experiments designed to investigate the effects of polymer solution 'carry-over' and subsequent co-mixing and aggregation of PEI and Pix polymers in vials during fabrication, the dipping procedure described above was followed, with the exception that the rinse solutions were replaced with fresh acetone after every rinse step. After film fabrication, a droplet of solution from each polymer solution vial was placed onto a silicon substrate for SEM imaging, as described above.

Results and Discussion. Past work has demonstrated that PEI/PVDMA multilayers can be fabricated in ways that lead to either (i) thin and smooth films that are optically transparent (see Broderick et al., Biomacromolecules 2011, 12(6): 1998; Broderick et al., Chemistry of Materials 2012, 24(5): 938; Fredin et al., Biomacromolecules 2009, 10(4): 994; Broderick et al., ACS Applied Materials & Interfaces 2013, 5(2): 351; and Holden et al., Analytical Chemistry 2015, 87(22): 11420), or (ii) thicker films that are optically opaque and exhibit micro- and nanoscale roughness and substantial internal porosity (see Buck et al., Langmuir, 2010, 26(20): 16134; Broderick et al., Chemistry of Materials 2012, 24(10): 1786; Manna et al., Advanced Materials, 2012, 24(31): 4291; Manna et al., Advanced Functional Materials 2015, 25(11): 1672; Carter et al., Chemistry of Materials 2016, 28(14): 5063; Buck et al., Chemistry of Materials 2010, 22(23): 6319; Manna et al., Advanced Materials 2013, 25(36): 5104; Manna et al., Advanced Materials 2013, 25(22): 3085; Manna et al., Advanced Materials 2013, 25(44): 6405; Manna et al., U.; Lynn, D. M. Fabrication of Liquid-Infused Surfaces Using Reactive Polymer Multilayers: Principles for Manipulating the Behaviors and Mobilities of Aqueous Fluids on Slippery Liquid Interfaces. Advanced Materials 2015, 27 (19): 3007; Kratochvil et al., ACS Biomaterials Science & Engineering 2015, 1(10): 1039; Kratochvil et al., ACS Infectious Diseases 2016, 2(7): 509; Manna et al., Advanced Functional Materials 2016, 26(21): 3599; Manna et al., ACS Applied Materials & Interfaces 2013, 5(16): 7731; Kratochvil et al., ACS Applied Materials and Interfaces 2017, 9: 10243-10253).

The approaches used to fabricate these materials have in common protocols that involve the iterative and alternating immersion of substrates into solutions of PEI and PVDMA in acetone, with intervening exposure to acetone rinse solutions. As described above, past studies have identified specific procedures and process parameters that can be used to bias film growth toward the evolution of substantial nanoscale roughness and porosity. For example, the use of (i) PVDMA synthesized in the presence of cyclic oligomers of VDMA and (ii) protocols that do not involve the regular replacement of polymer and rinse solutions during fabrication, have both been used to fabricate nanoporous and topographically complex coatings that exhibit superhydrophobicity, superhydrophilicity, or underwater superoleophilicity when functionalized with appropriate amine-based nucleophiles (e.g., hydrophobic or hydrophilic amines, as discussed below).

However, samples of PVDMA, synthesized using previously reported protocols, were encountered that either did not lead to substantial roughness or porosity, or lead to films that were porous and rough, but that did not exhibit some anticipated functional properties (e.g., extreme wetting behaviors) after post-fabrication functionalization. Those results prompted additional spectroscopic characterization and comparisons of samples of PVDMA used in those experiments revealed evidence of variable levels of side chain azlactone hydrolysis in polymers synthesized under otherwise similar conditions (these results are discussed in greater detail below). The ring-opening hydrolysis of the azlactone side groups in PVDMA yields carboxylic acid functionality, as shown in Scheme 2. For purposes of clarity in the discussion below, PVDMA is referred to herein as 'polymer P1' and PVDMA containing specific mole fractions of hydrolyzed side groups, as depicted in Scheme 2, is denoted as 'polymers $P1_x$', where 'x' denotes a specific mole fraction of hydrolyzed repeat units. Initial observations from those characterization studies suggested that the presence and variability of hydrolyzed azlactone groups in these polymers could play a role in the evolution of rough and nanoporous morphologies observed in PEI/PVDMA multilayers and motivated the additional series of synthetic and physicochemical characterization studies described below.

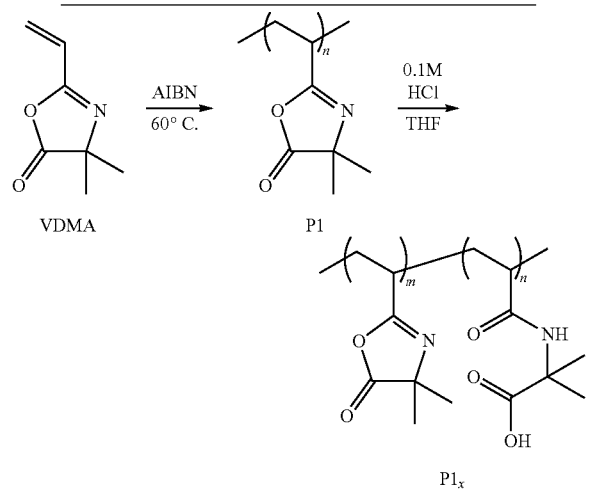

Scheme 2.
General scheme showing the polymerization of VDMA to P1, and subsequent partial-hydrolysis to yield P1x deriviatives.

A first series of experiments was designed to synthesize samples of P1 and provide insight into factors that could lead to side chain hydrolysis. To initiate these studies, samples of P1 were prepared using VDMA monomer that was freshly vacuum distilled (Scheme 2; see Materials and Methods for additional details related to the polymerization of VDMA). The use of freshly distilled monomer yielded P1 that did not contain hydrolyzed side chain groups (see Holden et al., Analytical Chemistry 2015, 87(22): 11420; Appadoo et al., Bioengineering & Translational Medicine 2016, DOI: 10.1002/btm2.10023; Carter et al., Macromolecules 2016, 49(15): 5514) whereas samples of P1 synthesized using monomer that was not freshly distilled often lead to polymers with varying degrees of side chain hydrolysis (i.e., $P1_x$, Scheme 2), as determined by characterization using FTIR.

FIG. 1 shows the IR spectra of P1 and a typical sample of $P1_x$ polymerized using monomer that was not freshly distilled, similar to that used in past studies to fabricate nanoporous PEI/PVDMA films. The diagnostic azlactone carbonyl (C=O, 1821 cm$^{-1}$) and azlactone imine (C=N, 1672 cm$^{-1}$) stretches are present in both spectra (see Buck et al., Polymer Chemistry 2012, 3(1): 66; and Heilmann et al., Journal of Polymer Science Part A: Polymer Chemistry 2001, 39(21): 3655).

However, the spectrum of $P1_x$ also reveals a carboxylic acid carbonyl (C=O, 1734 cm$^{-1}$) stretch and an amide bending mode (N—H, 1528 cm$^{-1}$) characteristic of hydrolyzed side chain groups. Evidence of a ring-opened amide carbonyl peak can also be seen as a shoulder on the C=N peak in the $P1_x$ spectrum (C=O ~1650 cm$^{-1}$) (see Buck et al., Polymer Chemistry 2012, 3(1): 66; and Heilmann et al., Journal of Polymer Science Part A: Polymer Chemistry 2001, 39(21): 3655). The presence of a hydrolyzed VDMA monomer was not observed in samples that were not freshly distilled by NMR, nor were substantial differences detected in the water content of freshly distilled VDMA (735±97 ppm) and samples that were not freshly distilled (645±76 ppm) by Karl-Fisher titration.

When combined, these latter results suggest that the hydrolyzed units in samples of $P1_x$ do not arise from the incorporation of hydrolyzed monomer or the presence of water during polymerization. It was speculated that the partial hydrolysis observed in these samples and others used in past studies may be promoted by the presence of other currently unidentified impurities that may exist as a by-product of monomer synthesis (Heilmann et al., Journal of Polymer Science Part A: Polymer Chemistry 2001, 39(21): 3655) or that can form upon the standing and storage of VDMA, or by impurities introduced by the addition of cyclic oligomers of VDMA (see Buck et al., Chemistry of Materials 2010, 22(23): 6319; and Heilmann et al., Journal of Macromolecular Science, Part A 2003, 40(8): 755) used to prepare PVDMA in some past studies. It is also possible for side chain hydrolysis to occur after polymerization and upon storage by exposure to water, heat, or other acidic species.

A series of initial experiments was also performed using the P1 and the $P1_x$ polymers characterized above to fabricate PEI/PVDMA multilayers using a protocol used in past studies to fabricate rough and nanoporous coatings.

Figure 2:
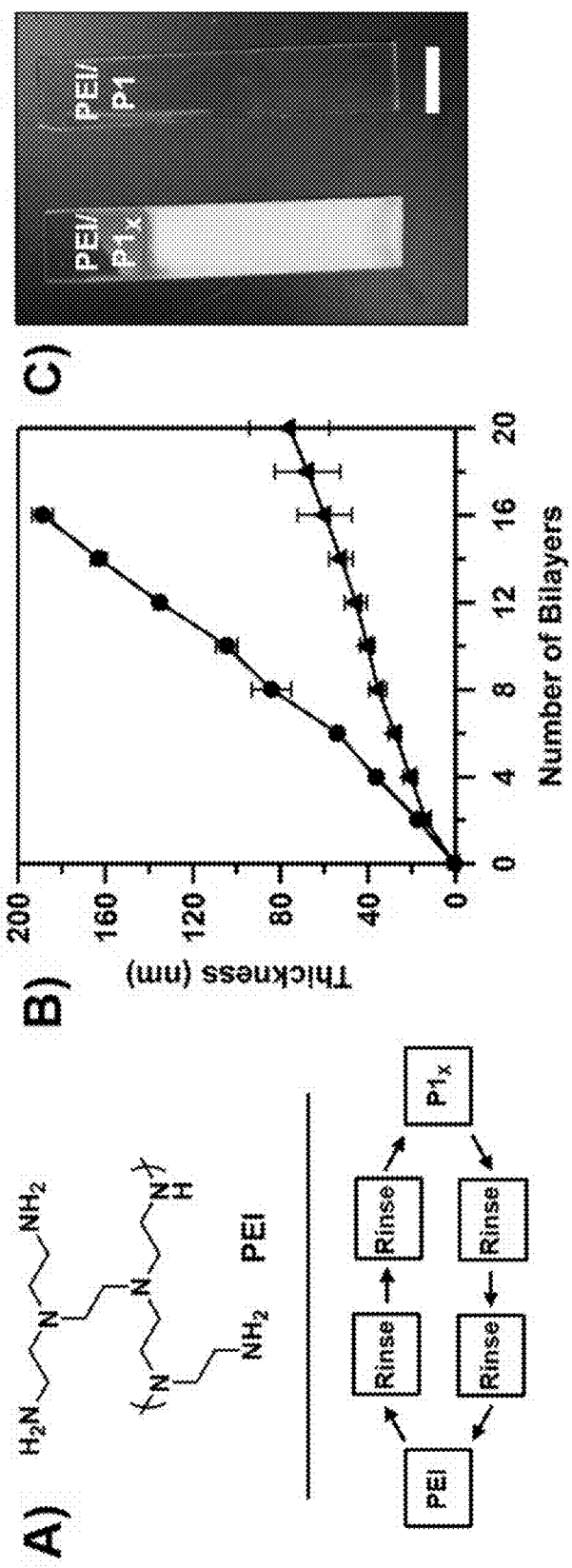
FIG. 2. (A) Chemical structure of branched poly(ethylenimine) (top) and schematic showing the process flow of the layer-by-layer approach used to fabricate the films investigated in these studies (bottom). (B) Film growth profiles for PEI/P1 (filled triangles) and PEI/$P1_X$ (filled circles) films fabricated on planar silicon substrates, as characterized by ellipsometry. (C) Photos showing the physical appearance of 35 bilayer thick PEI/$P1_X$ and PEI/P1 films assembled on glass substrates. Scale bar=1 cm.

In brief, this protocol involves the iterative immersion of substrates into a solution of PEI, two subsequent rinse solutions, then a solution of $P1_x$, and finally two additional rinse solutions, to fabricate one PEI/PVDMA bilayer (FIG. 2, panel A); this basic cycle was repeated multiple times, as desired, to promote layer-by-layer growth. All solutions were prepared using acetone; see Materials and Methods for full details. FIG. 2, panel B, shows the increase in optical thickness, as determined by ellipsometry, for PEI/P1 and PEI/$P1_x$ films fabricated on reflective silicon substrates as a function of the number of bilayers deposited. These results reveal PEI/P1 films (filled triangles) to grow relatively slowly and with a linear profile for the deposition of up to 20 bilayers to an average thickness of ~75 nm; this film growth profile is similar to those reported in several past studies on the layer-by-layer assembly of PEI/PVDMA films (see Buck et al., Advanced Materials 2007, 19(22): 3951). In contrast, PEI/P1$_X$ films (filled circles) increased in thickness much more rapidly, with a profile that was also roughly linear but with a greater slope, for up to 16 bilayers to an average thickness of ~190 nm under otherwise identical conditions (these films became optically opaque after 16 bilayers were deposited, preventing further analysis of film growth using ellipsometry).

FIG. 2, panel C, shows digital photographs of PEI/P1 and PEI/P1$_X$ films 35 bilayers thick fabricated on glass substrates under otherwise identical conditions. PEI/P1 films fabricated under these conditions (right) were smooth and optically uniform and transparent; PEI/P1$_X$ films (left) were optically opaque and exhibited surface roughness that was apparent to the naked eye, similar to rough and nanoporous coatings reported in other past studies referenced above.

When combined, these results suggested that the presence of hydrolyzed azlactone functionality in PVDMA could contribute to the evolution of micro- and nanostructures during layer-by-layer assembly. Additional characterization of P1 and P1$_X$ by gel permeation chromatography revealed similar molecular weights and dispersities (see FIG. 9), suggesting that the differences shown in FIG. 2 do not arise from large differences in these macromolecular parameters.

In all further studies described below, experiments were performed using samples of P1$_X$ synthesized by the intentional and controlled hydrolysis of P1 to investigate the influence of hydrolysis and differences in carboxylic acid group content on film growth and morphology.

TABLE 1

Percentage of Side Chain Hydrolysis (Hydrolysis, %) and [Azlactone]:[Acid] IR Peak Intensity Ratio for P1x Copolymers Synthesize in This Example.

| Name | Hydrolysis, %[a] | [Azlactone]:[Acid][b] |
|------|------------------|-----------------------|
| P1   | 0                | 2.67                  |
| P1$_A$ | 13.8 ± 0.9     | 7.37                  |
| P1$_B$ | 16.7 ± 1.1     | 4.54                  |
| P1$_C$ | 25.9 ± 1.6     | 3.57                  |
| P1$_D$ | 35.5 ± 2.1     | 3.05                  |

[a]Percentage of side chain hydrolysis, as determined by quantitative $^{13}C\{^1H\}$ NMR spectroscopy;
[b][Azlactone]:[Acid] ratio calculated from the IR azlactone carbonyl (C=O) peak height (1822 cm$^{-1}$) divided by the carboxylic acid carbonyl (C=O) peak height (1734 cm$^{-1}$).

Figure 3:
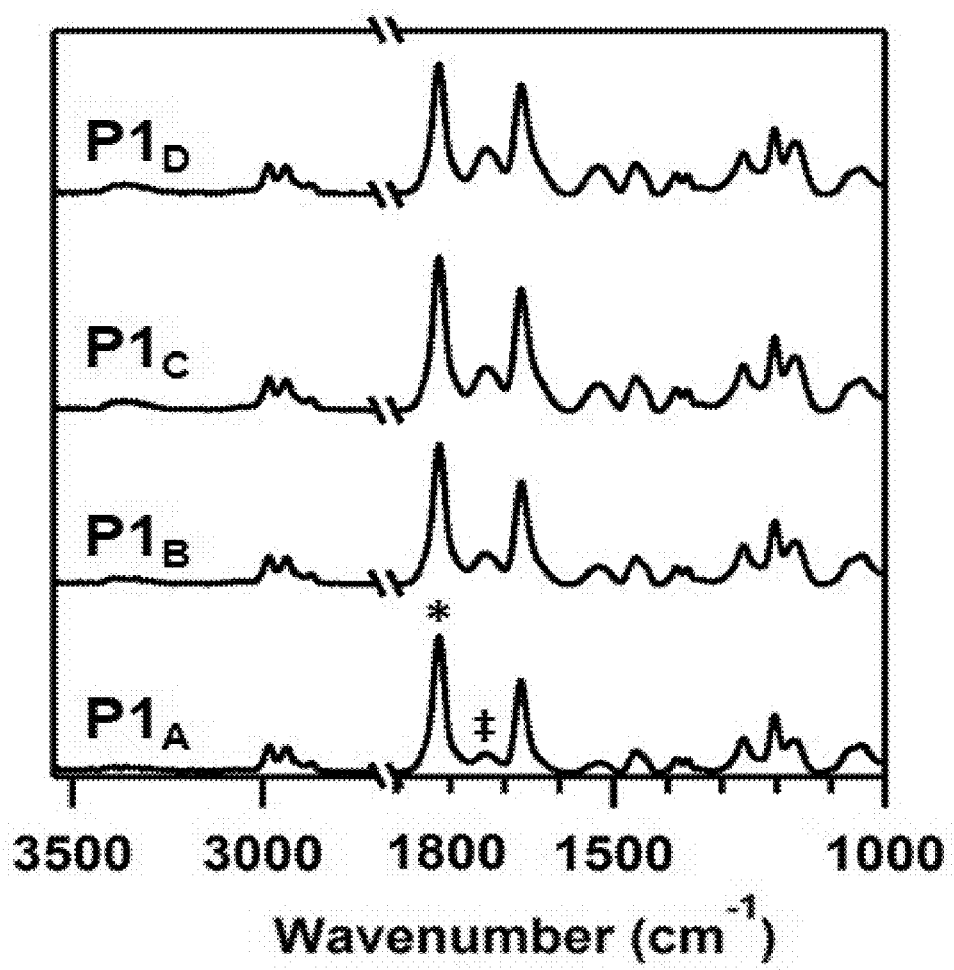
FIG. 3. ATR IR spectra for partially hydrolyzed derivatives $P1_A$, $P1_B$, $P1_C$, and $P1_D$. The intensity of the azlactone carbonyl [denoted by (*); C=O, 1818 cm$^{-1}$] peak decreases relative to the intensity of the carboxylic acid carbonyl stretching [denoted by (‡); C=O, 1734 cm$^{-1}$] with increasing fraction of partial-hydrolysis from $P1_A$ to $P1_D$; this ratio is provided for each polymer in Table 1 (below).
Figure 10:
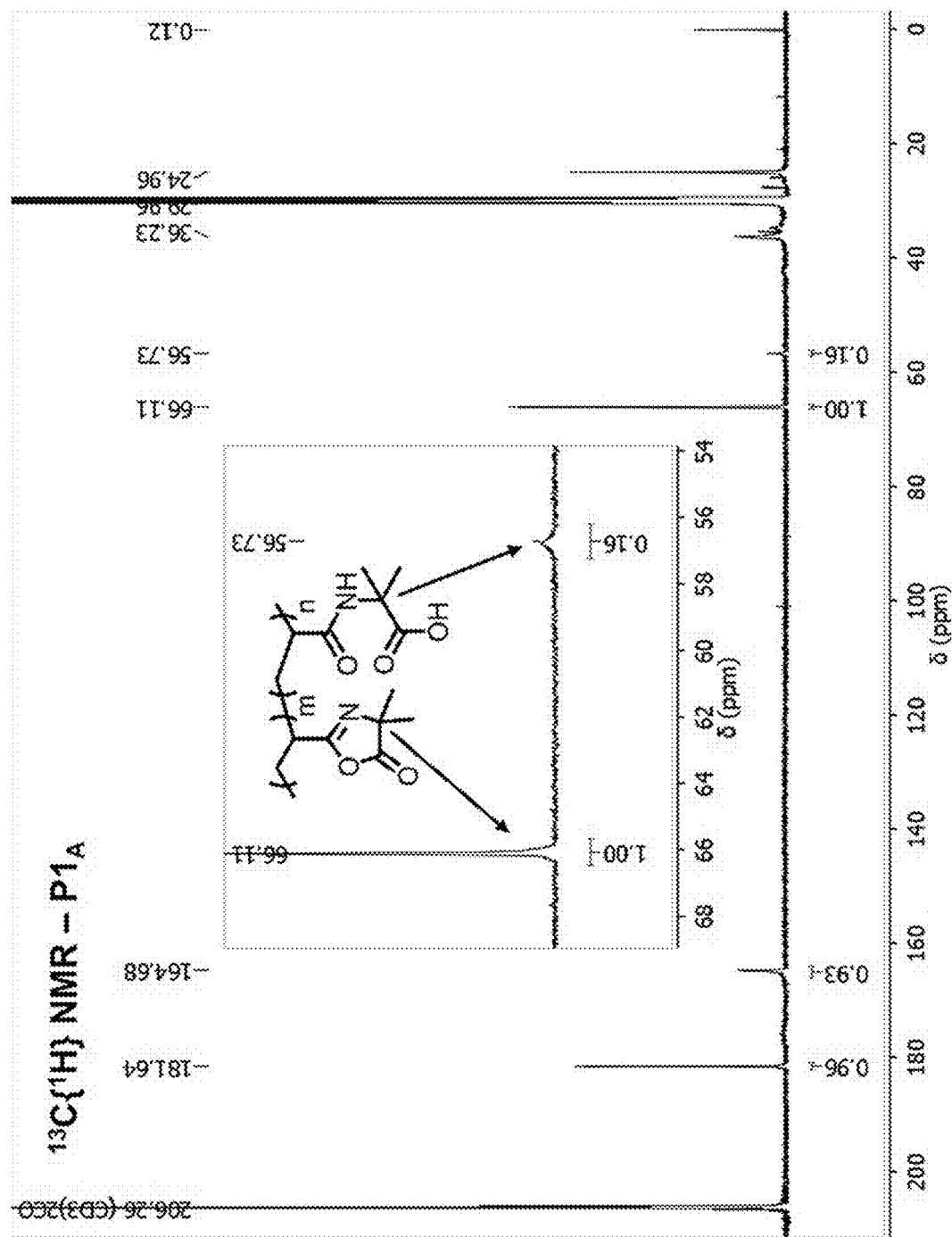
FIG. 10. Representative quantitative $^{13}C\{^{1}H\}$ NMR spectrum used to determine the degree of azlactone group hydrolysis in partially hydrolyzed P1 derivatives. The spectrum for $P1_A$ is shown as an example.

Scheme 2 shows an approach to the synthesis of P1$_X$ derivatives having different degrees of partial side chain hydrolysis. Treatment of solutions of P1 in THF with a known amount of water and in the presence of an acid catalyst yielded polymers P1$_A$, P1$_B$, P1$_C$, and P1$_D$, as shown in Table 1. (It is noted here that the addition of water alone to solutions of P1 in THF, followed by overnight incubation, did not induce any azlactone hydrolysis, as monitored by IR spectroscopy). The percentage of hydrolysis (the mole fraction of carboxylic acid groups) affected under these conditions was determined using quantitative $^{13}C\{^1H\}$ NMR spectroscopy. As shown in Table 1, the percentage of hydrolysis ranged from 13.8% to 35.5% (analysis methods are described in the Materials and Methods section, and a representative $^{13}C\{^1H\}$ NMR spectrum is shown in FIG. 10). FIG. 3 shows representative IR spectra for these partially hydrolyzed polymers. These show that as the percentage of hydrolysis increases (from P1$_A$ to P1$_D$), the height of the azlactone carbonyl peak at 1821 cm$^{-1}$ decreases, and the carboxylic acid carbonyl peak at 1734 cm$^{-1}$ increases; the ratio of these two peak heights for polymers P1$_A$ to P1$_D$ are given in Table 1. It is also noted that, as the percentage of hydrolysis increased from P1$_A$ to P1$_D$, evidence of the amide N—H bending mode (1528 cm$^{-1}$) became more pronounced.

Figure 4:
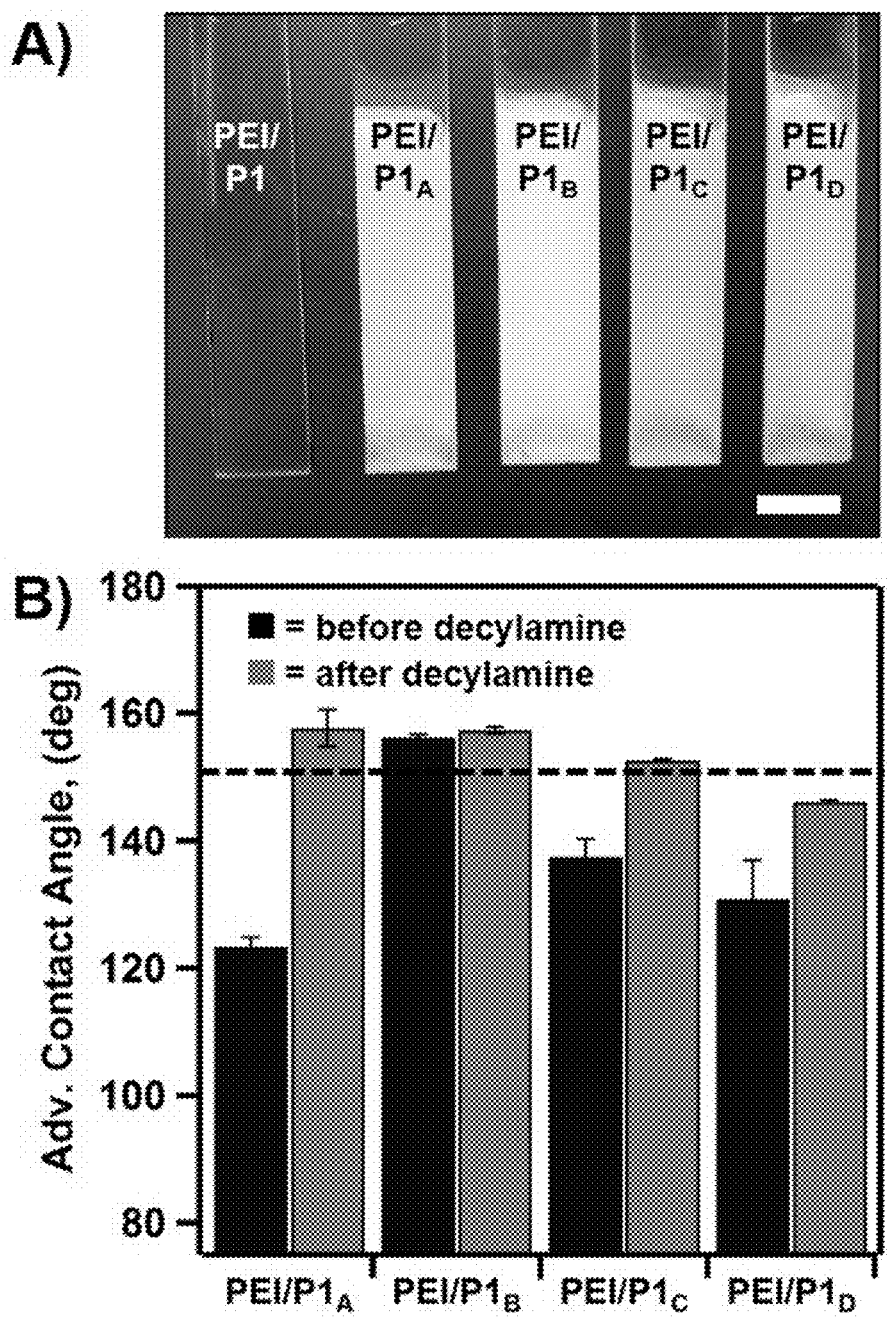
FIG. 4. (A) Digital pictures showing the physical appearance of 35 bilayer thick PEI/P1 and PEI/$P1_X$ films assembled on glass substrates. Scale bar=1 cm. (B) Plot showing the advancing water contact angle measured on PEI/$P1_X$ films fabricated using $P1_A$, $P1_B$, $P1_C$, and $P1_D$ shown in part A. Water contact angles were measured before (black bars) and after functionalization with decylamine (grey bars; see text). Error bars represent the standard deviation of at least five measurements.

FIG. 4, panel A, shows digital pictures of PEI/PVDMA multilayers 35 bilayers thick fabricated using P1$_A$, P1$_B$, P1$_C$, and P1$_D$ and iterative immersion protocols identical to those described above. An image of a control PEI/P1 film fabricated using pristine PVDMA is also shown for comparison. All of the films fabricated using the partially hydrolyzed derivatives were optically opaque and appeared rough to the naked eye, similar to the coatings described above using P1$_X$ and shown in FIG. 2, panel C. However, the film fabricated using P1 (containing 0% hydrolyzed side chains) was again optically clear, visually smooth, and uniform. FIG. 4, panel B, shows the results of analysis of the advancing water contact angles (θ) of multilayers fabricated using P1 and polymers P1$_A$, P1$_B$, P1$_C$, or P1$_D$. Black bars in FIG. 4, panel B, show the water contact angles measured on as-fabricated (azlactone-containing) films; grey bars show contact angles measured after the functionalization of those reactive films by treatment with decylamine (20 mg/mL in THF, overnight), a hydrophobic amine used in past studies (see references described above) on the fabrication of nanoporous and superhydrophobic PEI/PVDMA coatings.

Figure 11:
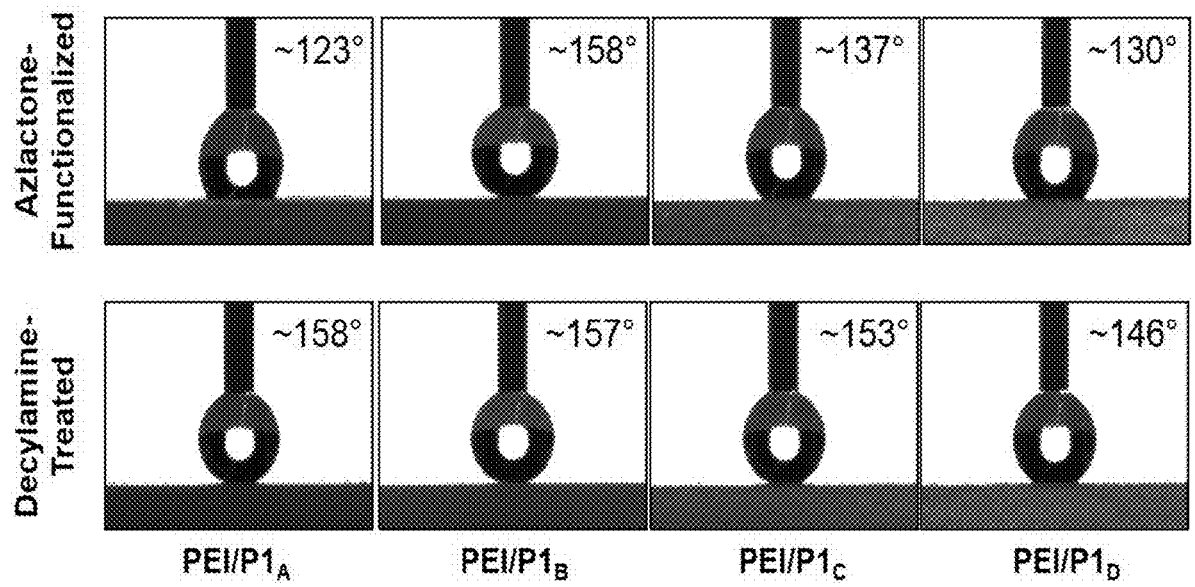
FIG. 11. Representative images of advancing water contact angle measurements for 35 bilayer thick PEI/$P1_X$ films assembled using $P1_A$, $P1_B$, $P1_C$, and $P1_D$. These and other related contact angle measurements are combined and presented as averages with standard deviations in FIG. 4 (panel B) of the main text.

Films fabricated using P1$_A$, the P1$_X$ derivative having the lowest amount of hydrolysis, at 13.8%, were the least hydrophobic, with θ=123.4±1.4°, but became superhydrophobic after decylamine functionalization, θ=157.7±2.9°. In contrast, PEI/P1B films (16.7% hydrolyzed) were superhydrophobic both before (θ=156.2±0.4°) and after (θ=157.3±0.5°) functionalization. PEI/P1$_C$ films (25.9% hydrolyzed) exhibited similar wetting behaviors to PEI/P1$_B$ films (θ=137.5±2.7° before functionalization, and θ=152.6±0.2° after functionalization). In contrast, PEI/P1$_D$ films (35.5% hydrolyzed) did not exhibit superhydrophobicity either before (θ=130.8±6.1°) or after (θ=146.0±0.3°) functionalization. Representative images of water droplets contacting these surfaces acquired during these experiments are shown in FIG. 11. On the basis of these results, it was concluded that (i) the amount of carboxylic acid side chain functionality present in the P1$_X$ derivatives used to fabricate these materials has a significant influence on the wetting behaviors of these materials, and (ii) there is an apparent window of carboxylic acid content (between ~17% and ~25%) over which superhydrophobicity can be achieved after treatment with decylamine. Films fabricated using P1$_X$ derivatives containing higher percentages of hydrolyzed side groups (e.g., P1, ~36% hydrolysis) were rough and optically opaque (FIG. 4, panel A) but were not superhydrophobic either before or after decylamine functionalization. Moreover, films fabricated using P1$_X$ derivatives with lower extents of hydrolysis (e.g., P1$_A$, ~17% hydrolysis) exhibited superhydrophobicity even prior to functionalization with decylamine.

Figure 5:
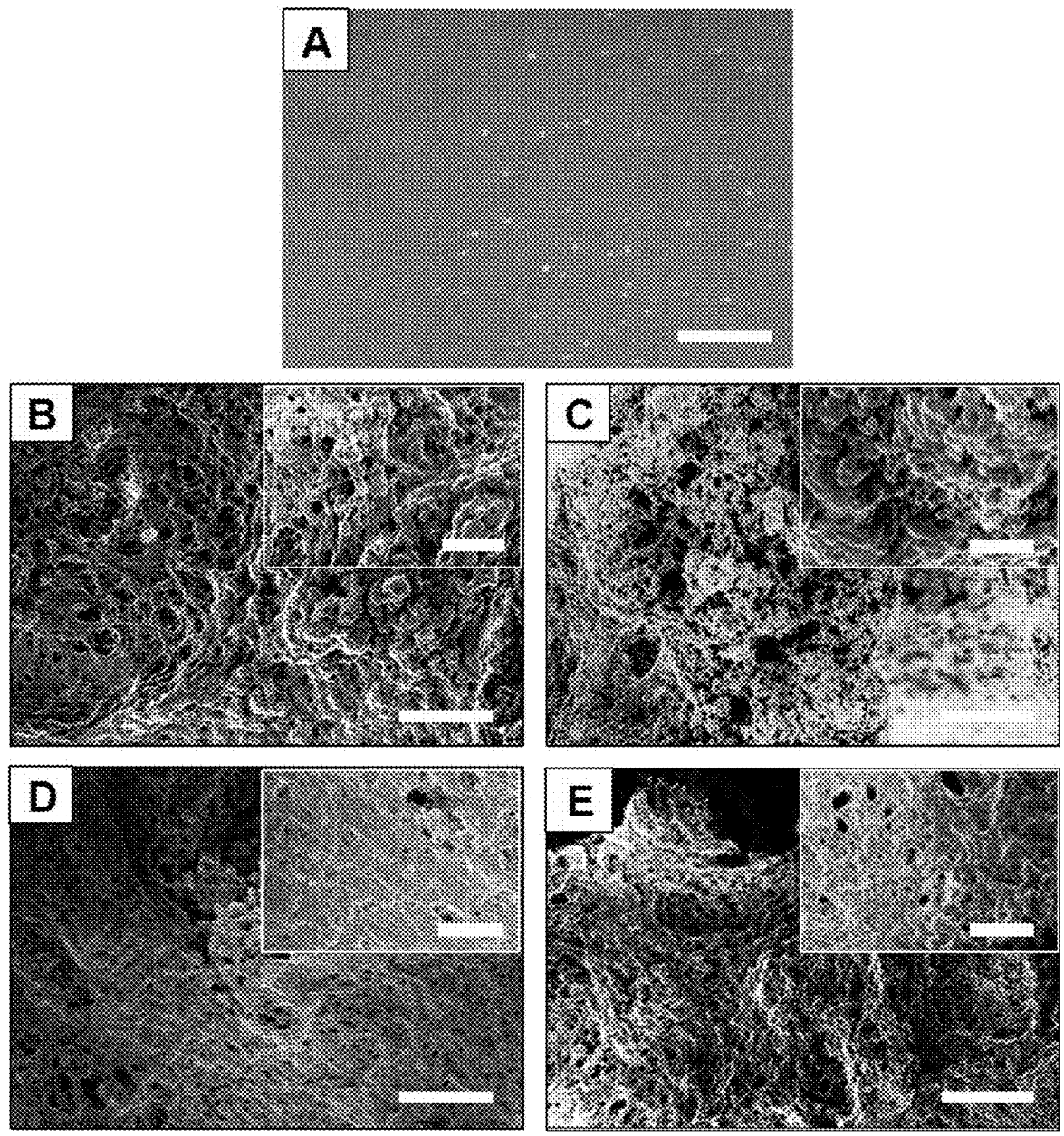
FIG. 5. (A-E) SEM images showing the film morphology at the surfaces of 35 bilayer thick PEI/P1 and PEI/$P1_X$ assembled on glass substrates. PEI/P1 films shown in (A) are largely featureless, while films assembled using (B) $P1_A$, (C) $P1_B$, (D) $P1_C$, and (E) $P1_D$ exhibit more complex morphologies with many micro- and nanoscale features. Scale bar=5 µm; 2 µm insets.

The potential differences in film morphology exhibited by PEI/PVDMA films fabricated using P1, P1$_A$, P1$_B$, P1$_C$, and ND were then characterized. FIG. 5 shows top-down SEM images of the five films shown in FIG. 4, panel A. These images reveal PEI/P1 films to be uniformly smooth and largely featureless (FIG. 5, panel A), but that all other films assembled using P1$_{A-D}$ exhibited more complex morphologies and many micro- and nanoscale topographic features that were not present in PEI/P1 films (FIG. 5, panels B-E).

Further inspection of the images (see also the insets in these images) reveals qualitative differences in film morphologies that vary with the percentages of hydrolysis in the $P1_X$ derivatives used to fabricate the films. For example, films fabricated using $P1_A$ and $P1_B$ (FIG. 5, panels B-C), which contain the lowest percentages of hydrolysis (~14% and ~17%, respectively) exhibit complex morphologies composed of surface-exposed nanoscale bumps, particles, and pores that are similar to features reported previously for many nanoporous and topographically rough PEI/PVDMA films that exhibit extreme non-wetting behaviors.

In contrast, inspection of the images in FIG. 5, panels D-E, reveals films fabricated from polymers with higher percentages of hydrolysis ($P1_C$ and $P1_D$, with ~26% and ~36% hydrolysis, respectively) to have complex morphologies with qualitatively smoother surfaces, or a lack of readily observable hierarchical nanoscale features similar to those shown in FIG. 5, panels B-C. These differences in morphology and nanoscale topographic features could account, at least in part, for the lower water contact angles observed for the $PEI/P1_C$ and $PEI/P1_D$ films shown in FIG. 4, panel B (black bars). Taken together, the SEM images in FIG. 5 and the water contact angle results in FIG. 4, panel B, hint that the apparent influence of side chain hydrolysis on the wetting behaviors of these coatings could arise, at least in part, from the influence of carboxylic acid groups on the nanoscale morphologies that evolve during assembly. It is likely that differences in the number of hydrophilic carboxylic acid groups present in the films also plays an important role in defining the wetting properties of these materials. Ultimately, the wetting behaviors of these materials, as defined by the contact angle measurements reported here, are likely to be a result of the interplay of the influences of both morphology and surface energy.

Figure 6:
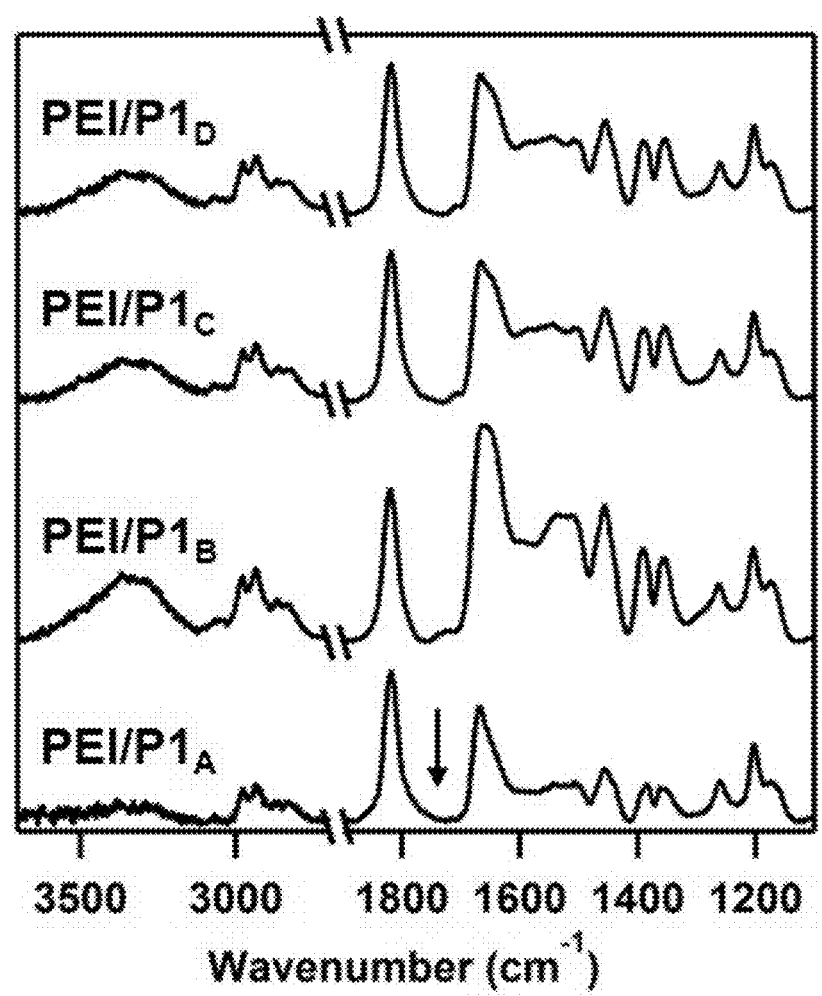
FIG. 6. ATR IR spectra for 35 bilayer thick PEI/$P1_X$ films assembled on glass substrates using partially hydrolyzed derivatives $P1_A$, $P1_B$, $P1_C$, and $P1_D$. The black arrow indicates the expected position of the carboxylic acid carbonyl stretching (C=O, 1734 cm$^{-1}$, based on the IR spectra of the individual polymers prior to assembly; see FIG. 1).

FIG. 6 shows ATR IR spectra of PEI/PVDMA films fabricated using $P1_A$, $P1_B$, $P1_C$, and $P1_D$ prior to treatment with decylamine. Inspection of these images reveals the presence of unreacted azlactone functionality (e.g., the azlactone carbonyl peak at 1821 cm$^{-1}$), and that the carboxylic acid carbonyl peak observed in the IR spectra of polymers using $P1_A$, $P1_B$, $P1_C$, and $P1_D$ (C=O 1734 cm$^{-1}$; see FIG. 3) is absent. Because PEI contains basic primary, secondary, and tertiary amine functionality, it is likely that the carboxylic acid groups in these films could be substantially deprotonated and, thus, present in the carboxylate form. It is speculated that the absence of a carboxylic acid carbonyl peak in the IR spectra of these films (FIG. 6) arises from conversion to carboxylate functionality that exhibits a carbonyl stretch (reported at ~1645 cm$^{-1}$ for cross-linked polymer beads containing hydrolyzed VDMA in the sodium salt form) that is obscured by the overlapping amide carbonyl stretch and azlactone imine peaks that are centered at ~1664 cm$^{-1}$ (Heilmann et al., Journal of Polymer Science Part A: Polymer Chemistry 2001, 39(21): 3655; and Rasmussen et al., Reactive Polymers 1992, 16(2): 199). Although the results shown in FIG. 6 are not definitive proof of ion-pairing interactions between the carboxylic acid functionality and the amine functionality in PEI and $P1_X$ in these films, these results are generally consistent with that possibility.

Without wishing to be bound by theory, it is hypothesized that the nanoscale structures and porous morphologies shown above in FIG. 5, panels B-C, and reported in past studies could arise, during fabrication, from the formation of nanoscale aggregates of PEI and PVDMA either (i) in solution and prior to contact with the surface to be coated (in this scenario, film growth could occur, at least in part, by the deposition of preformed, solution-phase PEI-PVDMA nanostructures), or (ii) upon the deposition of either PEI or PVDMA on the surface of a growing film during individual steps in the fabrication cycle (in this scenario, these features would result from transformations that occur at the surface, or possibly within the bulk, of a growing film as each new polymer 'layer' is deposited). It is also possible that these morphologies could arise during other steps in the fabrication process, including at points during which film-coated substrates are removed from polymer or rinse solutions and transported to new solutions. At these points in the fabrication process, for example, brief exposure to air or physical transformations promoted by the evaporation of acetone could potentially lead to film decomposition or reorganization and the evolution of complex morphologies. Other possibilities may also exist that are not considered here. It is clear from visual inspection and physicochemical characterization of films during fabrication, however, that these morphologies develop and evolve during the fabrication process, and that nanoscale roughness and porosity do not arise as a consequence of transformations that occur after complete film assembly (e.g., upon final drying or upon long-term storage, etc.).

The first of the hypotheses above is supported generally by the observation that both the polymer solutions and primary rinse baths used during fabrication gradually become visually cloudy during fabrication, consistent with the formation of polymer aggregates in these solutions as film fabrication progresses. This phenomenon could arise from carryover of polymer into and between solutions during the iterative transfer of substrates from solution to solution during fabrication; see FIG. 2, panel A. (It should be noted that solutions of PEI and PVDMA alone do not flocculate or yield visible precipitates upon standing on the time scales used for film fabrication). To provide insight into the role that the formation of aggregates in these solutions could potentially play in the evolution of nanostructure in these materials during fabrication, a series of experiments were conducted using acetone solutions of PEI and a model $P1_X$ polymer containing 22.5% (±1.4%) hydrolyzed side groups. Characterization of PEI/PVDMA films fabricated using this polymer by ellipsometry, SEM, FTIR, and contact angle measurements revealed the influence of this polymer on film growth and morphology to be similar to that of $P1_C$.

Figure 7:
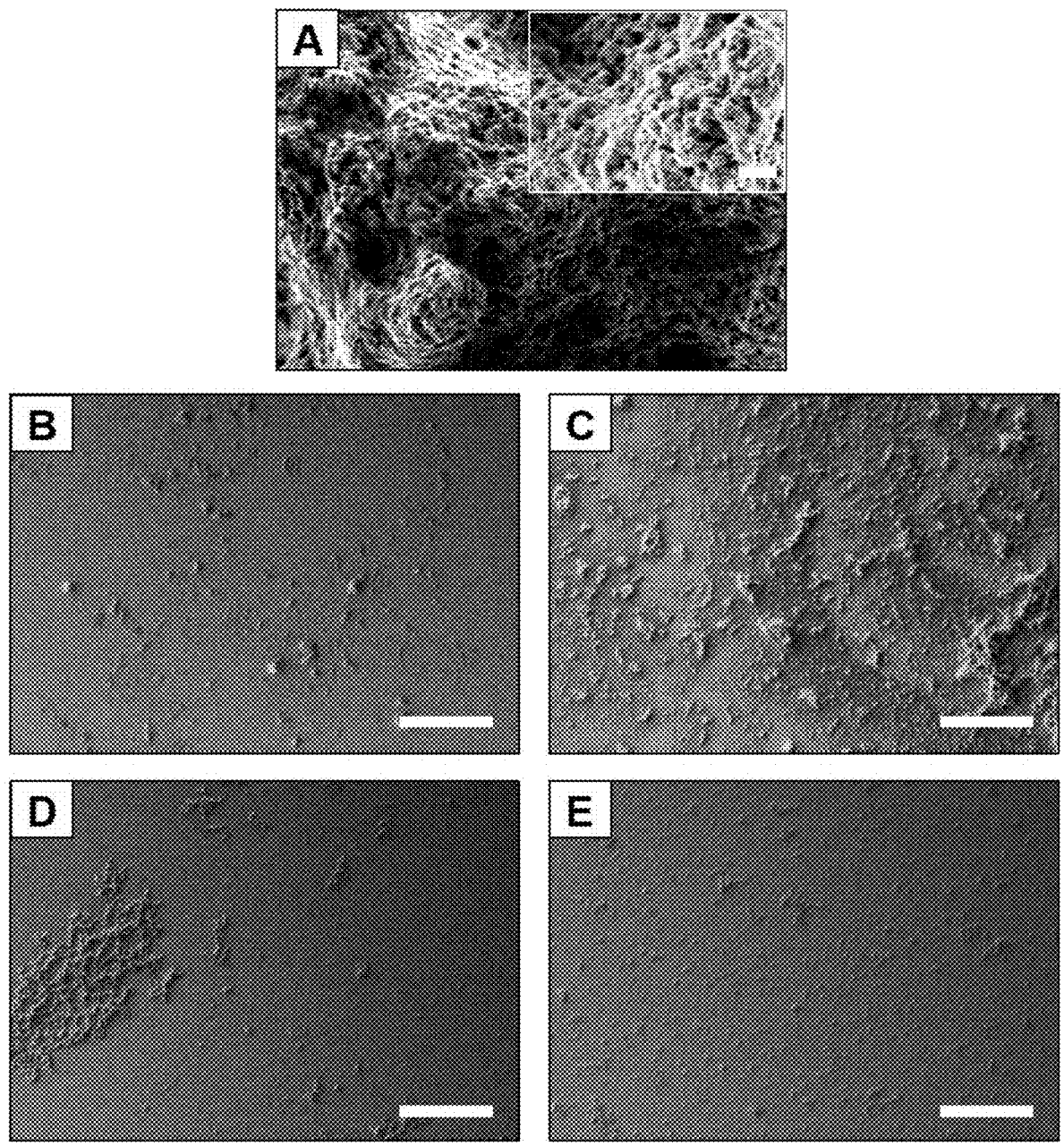
FIG. 7. (A) SEM image showing the morphology of a 35 bilayer thick PEI/$P1_X$ film assembled on a glass substrate using a model $P1_X$ with 22.5±1.4 percent hydrolysis. (B) and (C) show SEM images of polymer aggregates present in the dried samples of PEI and $P1_X$ film fabrication solutions, respectively, collected after film assembly. (D) and (E) show SEM images of polymer aggregates present in the first PEI and first $P1_X$ acetone rinse vials used for film fabrication, respectively, collected after film assembly (see text). Scale bar=5 µm; 1 µm insets.

FIG. 7 shows SEM images of samples of polymer solution (A: PEI solution; B: $P1_X$ solution) and the rinse baths (C: first rinse vial after immersion in PEI solution; D: first rinse vial after immersion in $P1_X$ solution) collected after the fabrication of a 35 bilayer PEI/PVDMA film (these solutions were placed on silicon and acetone was evaporated prior to imaging; see Materials and Methods section described above). Inspection of these images reveals the presence of microscale aggregates. Although it is not possible to infer from these results anything regarding the compositions of these aggregates, or the relationship between their sizes when dried and their sizes prior to drying, the aggregates in these images are consistent with the visible presence of aggregates of polymer in these solutions during and after fabrication and, more generally, the possibility that the nanoscale structures in the PEI/PVDMA films discussed above could arise from deposition or reaction of these aggregates onto surfaces during immersion at each step in the film fabrication process.

The results of additional control experiments in which films were fabricated using a modified rinse procedure suggested that nanoscale structure and morphology can also evolve during fabrication even when polymer aggregates are not substantially present in solution. In this modified procedure, rinse solutions were replaced with fresh acetone during fabrication after every single rinse step to prevent the accumulation and carryover of PEI or $P1_X$ during successive immersions (all other fabrication parameters were otherwise identical). The images in FIG. 8, panels D and E, show SEM images of the PEI and $P1_X$ solutions used in these experiments. Relative to the images shown in FIG. 7, these images reveal the absence of nanoscale or microscale aggregates, demonstrating that this modified rinse protocol was sufficient to prevent polymer carryover and aggregate formation in these solutions.

Figure 8:
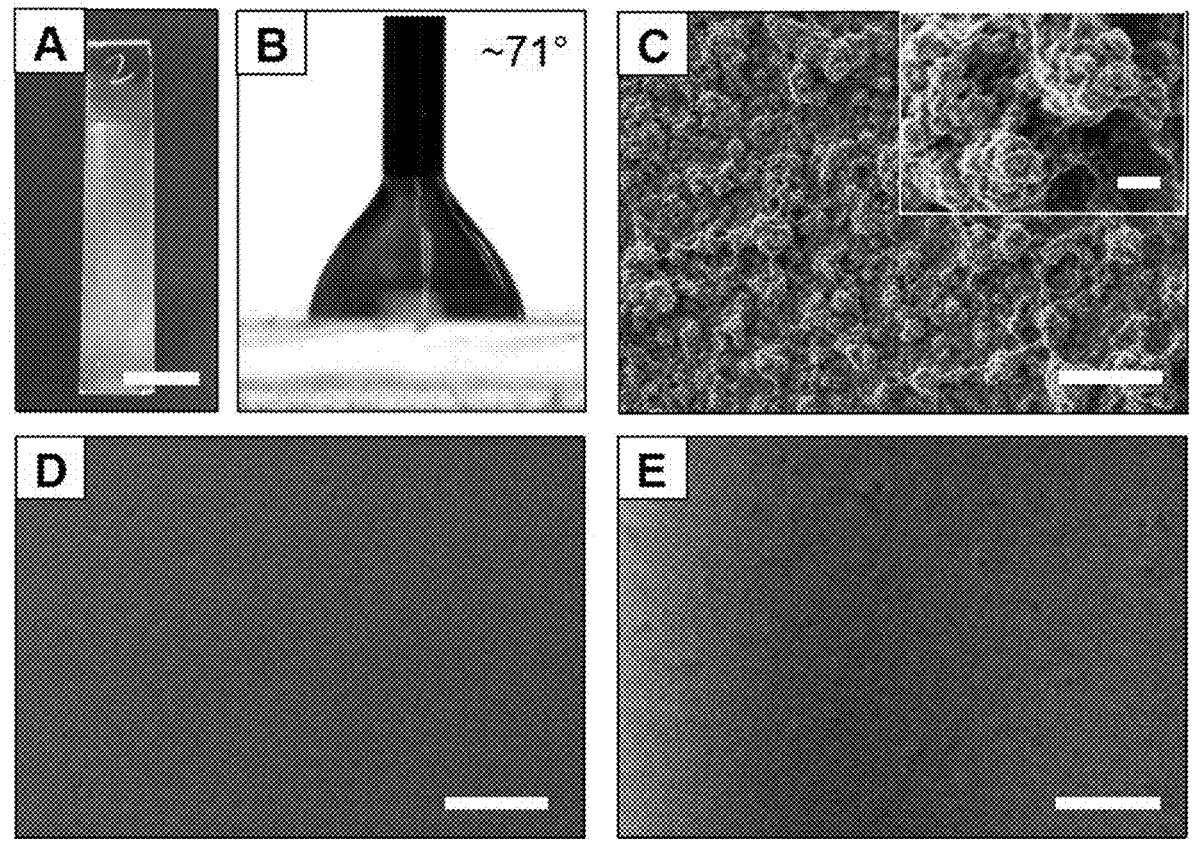
FIG. 8. Characterization of a 35 bilayer thick film fabricated using a model $P1_X$ with 22.5±1.4 percent hydrolysis by changing the acetone rinse solutions after every rinse step (see text). (A) Digital picture showing the physical appearance of the film; scale bar=1 cm. (B) Water contact angle analysis demonstrating that the film readily wet by water. (C) SEM image showing the morphology at the surface of the film. (D) and (E) show SEM images indicating the absence of polymer aggregates in the PEI and $P1_X$ film fabrication solutions, respectively, collected after film assembly (see text). Scale bars in (C-E)=5 µm; 1 µm insets.

FIG. 8, panel C, however, shows an SEM image of a 35-bilayer film fabricated using this modified protocol, and reveals the presence of significant nanoscale structure and texture on the surface of the film. Likewise, FIG. 8, panel A, shows an image of a film fabricated under similar conditions, and reveals the film to be visually rough and opaque, albeit not as visually rough or as opaque as films shown in FIG. 4. When combined, these results demonstrate that micro- and nanoscale features are able to form on the surfaces of growing films during the deposition of PEI or PVDMA in ways that can occur independent of the formation and possible deposition of solution-based polymer aggregates. However, films fabricated by this modified are visually different in appearance (FIG. 8, panel A), and results shown in FIG. 8, panel B, also demonstrate the contact angles of these films to be significantly less hydrophobic ($\theta$)–71° than films made by the more conventional fabrication protocol. On the basis of these experiments and observations, it is thus also possible that the formation and subsequent deposition of polymer aggregates in solution during fabrication could also play a role and lead to a more rapid onset of roughness and porosity.

Summary and Conclusions. The examples described above demonstrate that the presence of hydrolyzed azlactone groups in PVDMA can substantially influence the growth of multilayer films fabricated by the reactive layer-by-layer assembly of PEI and PVDMA. Whereas layer-by-layer assembly using unhydrolyzed PVDMA yields thin films that are smooth, transparent, and largely devoid of micro- and nanoscale features, films assembled using partially hydrolyzed PVDMA are thick, and exhibit substantial roughness and nano- and microscale topographic features and porosity. The morphologies and wetting behaviors of PEI/PVDMA films fabricated using PVDMA synthesized to contain defined amounts of hydrolyzed groups are, in general, similar to those of nanoporous and topographically complex PEI/PVDMA coatings reported in past studies.

The present results also demonstrate that the degree or extent of partial hydrolysis can influence the surface morphologies and interfacial behaviors of these films, and suggest that the carboxylic acid side chain groups that result from azlactone hydrolysis may participate in acid/base interactions, hydrogen bonding, and ionic interactions in these materials that could also influence structure formation and film growth. The presence of carboxylic acid functionality in partially hydrolyzed PVDMA also has the potential to increase rates of reactions between model amines and azlactones. These insights could shed light on similar processes that drive reactive layer-by-layer assembly and the formation of covalent crosslinks impart physical and chemical stability to PEI/PVDMA multilayers. Although the mechanism for structure formation and the evolution of roughness and porosity during the fabrication of these materials is not yet completely understood, the results reported here provide insight into molecular-level parameters that can influence it or be manipulated to promote changes in the structure and behaviors of PEI/PVDMA coatings (e.g., to fabricate thin and smooth films, to fabricate thick and nanoporous films, or to fabricate thick and nanoporous films that exhibit differences in morphology and wetting behaviors by changes in the extent of side chain hydrolysis or changes to film fabrication protocols).

Finally, it is noted that the potential for ion-pairing interactions between hydrolyzed side chains and the amines in PEI, and the potential for the acid functionality in partially hydrolyzed PVDMA (or the properties of the organic solvents used during assembly) to influence the rates at which, and the extents to which, covalent bonds may form during reactive assembly, could also introduce new tools useful for exerting new levels of control over structure formation in these materials. Overall, the results of these examples provide new insights and guiding principles that may prove useful for further tuning and tailoring the physicochemical behaviors and properties of these reactive coatings, as well as many new exciting avenues for future research in these and other similar poly(vinyl azlactone)/polyamine systems.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

One of ordinary skill in the art will appreciate that starting materials, reagents, purification methods, materials, substrates, device elements, analytical methods, assay methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that the use of such terms and expressions exclude any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. In each instance herein any of the terms "comprising", "consisting essentially of" and "consisting of" may be replaced with either of the other two terms.

When a group of materials, compositions, components or compounds is disclosed herein, it is understood that all individual members of those groups and all subgroups thereof are disclosed separately. When a Markush group or other grouping is used herein, all individual members of the group and all combinations and subcombinations possible of the group are intended to be individually included in the disclosure. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. In the disclosure and the claims, "and/or" means additionally or alternatively. Moreover, any use of a term in the singular also encompasses plural forms.

All references cited herein are hereby incorporated by reference in their entirety to the extent that there is no inconsistency with the disclosure of this specification. Some references provided herein are incorporated by reference to provide details concerning sources of starting materials, additional starting materials, additional reagents, additional methods of synthesis, additional methods of analysis, additional biological materials, and additional uses of the invention. All headings used herein are for convenience only. All patents and publications mentioned in the specification are indicative of the levels of skill of those skilled in the art to which the invention pertains, and are herein incorporated by reference to the same extent as if each individual publication, patent or patent application was specifically and individually indicated to be incorporated by reference. References cited herein are incorporated by reference herein in their entirety to indicate the state of the art as of their publication or filing date and it is intended that this information can be employed herein, if needed, to exclude specific embodiments that are in the prior art. For example, when composition of matter are claimed, it should be understood that compounds known and available in the art prior to Applicant's invention, including compounds for which an enabling disclosure is provided in the references cited herein, are not intended to be included in the composition of matter claims herein.

REFERENCES (1) Decher, G. Fuzzy nanoassemblies: Toward layered polymeric multicomposites. Science 1997, 277 (5330), 1232.
(2) Schönhoff, M. Self-assembled polyelectrolyte multilayers. Current Opinion in Colloid & Interface Science 2003, 8 (1), 86.
(3) Hammond, P. T. Form and Function in Multilayer Assembly: New Applications at the Nanoscale. Advanced Materials 2004, 16 (15), 1271.
(4) Decher, G. In Multilayer Thin Films: Sequential Assembly of Nanocomposite Materials, 2nd Edition; Decher, G.; Schlenoff, J. B., Eds.; Wiley-CVH, 2012.
(5) Xiao, F.-X.; Pagliaro, M.; Xu, Y.-J.; Liu, B. Layer-by-layer assembly of versatile nanoarchitectures with diverse dimensionality: a new perspective for rational construction of multilayer assemblies. Chemical Society Reviews 2016.
(6) Borges, J.; Mano, J. F. Molecular Interactions Driving the Layer-by-Layer Assembly of Multilayers. Chemical Reviews 2014, 114 (18), 8883.
(7) Quinn, J. F.; Johnston, A. P. R.; Such, G. K.; Zelikin, A. N.; Caruso, F. Next generation, sequentially assembled ultrathin films: beyond electrostatics. Chemical Society Reviews 2007, 36 (5), 707.
(8) Bergbreiter, D. E.; Liao, K.-S. Covalent layer-by-layer assembly—an effective, forgiving way to construct functional robust ultrathin films and nanocomposites. Soft Matter 2009, 5 (1), 23.
(9) Rydzek, G.; Schaaf, P.; Voegel, J.-C.; Jierry, L.; Boulmedais, F. Strategies for covalently reticulated polymer multilayers. Soft Matter 2012, 8 (38), 9738.
(10) Broderick, A. H.; Lynn, D. M. In Functional Polymers by Post-Polymerization Modification; Wiley-VCH Verlag GmbH & Co. KGaA, 2013.
(11) Tang, Z.; Wang, Y.; Podsiadlo, P.; Kotov, N. A. Biomedical Applications of Layer-by-Layer Assembly: From Biomimetics to Tissue Engineering. Advanced Materials 2006, 18 (24), 3203.
(12) Hammond, P. T. Engineering materials layer-by-layer: Challenges and opportunities in multilayer assembly. AIChE Journal 2011, 57 (11), 2928.
(13) Wood, K. C.; Chuang, H. F.; Batten, R. D.; Lynn, D. M.; Hammond, P. T. Controlling interlayer diffusion to achieve sustained, multiagent delivery from layer-by-layer thin films. Proceedings of the National Academy of Sciences 2006, 103 (27), 10207.
(14) Zacharia, N. S.; DeLongchamp, D. M.; Modestino, M.; Hammond, P. T. Controlling Diffusion and Exchange in Layer-by-Layer Assemblies. Macromolecules 2007, 40 (5), 1598.
(15) Zacharia, N. S.; Modestino, M.; Hammond, P. T. Factors Influencing the Interdiffusion of Weak Polycations in Multilayers. Macromolecules 2007, 40 (26), 9523.
(16) Gilbert, J. B.; Rubner, M. F.; Cohen, R. E. Depth-profiling X-ray photoelectron spectroscopy (XPS) analysis of interlayer diffusion in polyelectrolyte multilayers. Proceedings of the National Academy of Sciences 2013, 110 (17), 6651.
(17) Nolte, A. J.; Takane, N.; Hindman, E.; Gaynor, W.; Rubner, M. F.; Cohen, R. E. Thin Film Thickness Gradients and Spatial Patterning via Salt Etching of Polyelectrolyte Multilayers. Macromolecules 2007, 40 (15), 5479.
(18) Nolte, A. J.; Treat, N. D.; Cohen, R. E.; Rubner, M. F. Effect of Relative Humidity on the Young's Modulus of Polyelectrolyte Multilayer Films and Related Nonionic Polymers. Macromolecules 2008, 41 (15), 5793.
(19) Richardson, J. J.; Björnmalm, M.; Caruso, F. Technology-driven layer-by-layer assembly of nanofilms. Science 2015, 348 (6233).
(20) Buck, M. E.; Zhang, J.; Lynn, D. M. Layer-by-Layer Assembly of Reactive Ultrathin Films Mediated by Click-Type Reactions of Poly(2-Alkenyl Azlactone)s. Advanced Materials 2007, 19 (22), 3951.
(21) Buck, M. E.; Lynn, D. M. Azlactone-functionalized polymers as reactive platforms for the design of advanced materials: Progress in the last ten years. Polymer Chemistry 2012, 3 (1), 66.
(22) Buck, M. E.; Lynn, D. M. Free-Standing and Reactive Thin Films Fabricated by Covalent Layer-by-Layer Assembly and Subsequent Lift-Off of Azlactone-Containing Polymer Multilayers. Langmuir 2010, 26 (20), 16134.
(23) Buck, M. E.; Lynn, D. M. Functionalization of Fibers Using Azlactone-Containing Polymers: Layer-by-Layer Fabrication of Reactive Thin Films on the Surfaces of Hair and Cellulose-Based Materials. ACS Applied Materials & Interfaces 2010, 2 (5), 1421.
(24) Buck, M. E.; Lynn, D. M. Reactive Layer-by-Layer Assembly of Suspended Thin Films and Semipermeable Membranes at Interfaces Created Between Aqueous and Organic Phases. Advanced Materials 2010, 22 (9), 994.

(25) Broderick, A. H.; Azarin, S. M.; Buck, M. E.; Palecek, S. P.; Lynn, D. M. Fabrication and Selective Functionalization of Amine-Reactive Polymer Multilayers on Topographically Patterned Microwell Cell Culture Arrays. Biomacromolecules 2011, 12 (6), 1998.

(26) Broderick, A. H.; Manna, U.; Lynn, D. M. Covalent Layer-by-Layer Assembly of Water-Permeable and Water-Impermeable Polymer Multilayers on Highly Water-Soluble and Water-Sensitive Substrates. Chemistry of Materials 2012, 24 (10), 1786.

(27) Broderick, A. H.; Lockett, M. R.; Buck, M. E.; Yuan, Y.; Smith, L. M.; Lynn, D. M. In situ Synthesis of Oligonucleotide Arrays on Surfaces Coated with Crosslinked Polymer Multilayers. Chemistry of Materials 2012, 24 (5), 938.

(28) Manna, U.; Broderick, A. H.; Lynn, D. M. Chemical Patterning and Physical Refinement of Reactive Superhydrophobic Surfaces. Advanced Materials 2012, 24 (31), 4291.

(29) Manna, U.; Lynn, D. M. Synthetic Surfaces with Robust and Tunable Underwater Superoleophobicity. Advanced Functional Materials 2015, 25 (11), 1672.

(30) Carter, M. C. D.; Lynn, D. M. Covalently Crosslinked and Physically Stable Polymer Coatings with Chemically Labile and Dynamic Surface Features Fabricated by Treatment of Azlactone-Containing Multilayers with Alcohol-, Thiol-, and Hydrazine-Based Nucleophiles. Chemistry of Materials 2016, 28 (14), 5063.

(31) Buck, M. E.; Breitbach, A. S.; Belgrade, S. K.; Blackwell, H. E.; Lynn, D. M. Chemical Modification of Reactive Multilayered Films Fabricated from Poly(2-alkenyl azlactone)s: Design of Surfaces that Prevent or Promote Mammalian Cell Adhesion and Bacterial Biofilm Growth. Biomacromolecules 2009, 10 (6), 1564.

(32) Fredin, N. J.; Broderick, A. H.; Buck, M. E.; Lynn, D. M. Nanoimprinted Thin Films of Reactive, Azlactone-Containing Polymers: Combining Methods for the Topographic Patterning of Cell Substrates with Opportunities for Facile Post-Fabrication Chemical Functionalization. Biomacromolecules 2009, 10 (4), 994.

(33) Broderick, A. H.; Carter, M. C. D.; Lockett, M. R.; Smith, L. M.; Lynn, D. M. Fabrication of Oligonucleotide and Protein Arrays on Rigid and Flexible Substrates Coated with Reactive Polymer Multilayers. ACS Applied Materials & Interfaces 2013, 5 (2), 351.

(34) Holden, M. T.; Carter, M. C. D.; Wu, C.-H.; Wolfer, J.; Codner, E.; Sussman, M. R.; Lynn, D. M.; Smith, L. M. Photolithographic Synthesis of High-Density DNA and RNA Arrays on Flexible, Transparent, and Easily Subdivided Plastic Substrates. Analytical Chemistry 2015, 87 (22), 11420.

(35) Kinsinger, M. I.; Buck, M. E.; Campos, F.; Lynn, D. M.; Abbott, N. L. Dynamic Ordering Transitions of Liquid Crystals Driven by Interfacial Complexes Formed between Polyanions and Amphiphilic Polyamines. Langmuir 2008, 24 (23), 13231.

(36) Manna, U.; Zayas-Gonzalez, Y. M.; Carlton, R. J.; Caruso, F.; Abbott, N. L.; Lynn, D. M. Liquid Crystal Chemical Sensors That Cells Can Wear. Angewandte Chemie International Edition 2013, 52 (52), 14011.

(37) Guo, X.; Manna, U.; Abbott, N. L.; Lynn, D. M. Covalent Immobilization of Caged Liquid Crystal Microdroplets on Surfaces. ACS Applied Materials & Interfaces 2015, 7 (48), 26892.

(38) Buck, M. E.; Schwartz, S. C.; Lynn, D. M. Superhydrophobic Thin Films Fabricated by Reactive Layer-by-Layer Assembly of Azlactone-Functionalized Polymers. Chemistry of Materials 2010, 22 (23), 6319.

(39) Manna, U.; Lynn, D. M. Restoration of Superhydrophobicity in Crushed Polymer Films by Treatment with Water: Self-Healing and Recovery of Damaged Topographic Features Aided by an Unlikely Source. Advanced Materials 2013, 25 (36), 5104.

(40) Manna, U. M.; Carter, M. C. D.; Lynn, D. M. 'Shrink-to-Fit' Superhydrophobicity: Thermally-Induced Microscale Wrinkling of Thin Hydrophobic Multilayers Fabricated on Flexible Shrink-Wrap Substrates. Advanced Materials 2013, 25 (22), 3085.

(41) Manna, U.; Kratochvil, M. J.; Lynn, D. M. Superhydrophobic Polymer Multilayers that Promote the Extended, Long-Term Release of Embedded Water-Soluble Agents. Advanced Materials 2013, 25 (44), 6405.

(42) Manna, U.; Lynn, D. M. Fabrication of Liquid-Infused Surfaces Using Reactive Polymer Multilayers: Principles for Manipulating the Behaviors and Mobilities of Aqueous Fluids on Slippery Liquid Interfaces. Advanced Materials 2015, 27 (19), 3007.

(43) Kratochvil, M. J.; Tal-Gan, Y.; Yang, T.; Blackwell, H. E.; Lynn, D. M. Nanoporous Superhydrophobic Coatings that Promote the Extended Release of Water-Labile Quorum Sensing Inhibitors and Enable Long-Term Modulation of Quorum Sensing in Staphylococcus aureus. ACS Biomaterials Science & Engineering 2015, 1 (10), 1039.

(44) Kratochvil, M. J.; Welsh, M. A.; Manna, U.; Ortiz, B. J.; Blackwell, H. E.; Lynn, D. M. Slippery Liquid-Infused Porous Surfaces that Prevent Bacterial Surface Fouling and Inhibit Virulence Phenotypes in Surrounding Planktonic Cells. ACS Infectious Diseases 2016, 2 (7), 509.

(45) Manna, U.; Raman, N.; Welsh, M. A.; Zayas-Gonzalez, Y. M.; Blackwell, H. E.; Palecek, S. P.; Lynn, D. M. Slippery Liquid-Infused Porous Surfaces that Prevent Microbial Surface Fouling and Kill Non-Adherent Pathogens in Surrounding Media: A Controlled Release Approach. Advanced Functional Materials 2016, 26 (21), 3599.

(46) Gardner, C. M.; Stöver, H. D. H. Reactive Polyanions Based on Poly(4,4-dimethyl-2-vinyl-2-oxazoline-5-one-co-methacrylic acid). Macromolecules 2011, 44 (18), 7115.

(47) Manna, U.; Lynn, D. M. Patterning and Impregnation of Superhydrophobic Surfaces Using Aqueous Solutions. ACS Applied Materials & Interfaces 2013, 5 (16), 7731.

(48) Kratochvil, M. J.; Carter, M. C. D.; Lynn, D. M. Amine-Reactive Azlactone-Containing Nanofibers For the Immobilization and Patterning of New Functionality on Nanofiber-Based Scaffolds. ACS Applied Materials and Interfaces 2017, 9: 10243-10253.

(49) Appadoo, V.; Carter, M. C. D.; Lynn, D. M. Controlling the Surface-Mediated Release of DNA Using 'Mixed Multilayers'. Bioengineering & Translational Medicine 2016, DOI: 10.1002/btm2.10023.

(50) Carter, M. C. D.; Jennings, J.; Appadoo, V.; Lynn, D. M. Synthesis and Characterization of Backbone Degradable Azlactone-Functionalized Polymers. Macromolecules 2016, 49 (15), 5514.

(51) Heilmann, S. M.; Rasmussen, J. K.; Krepski, L. R. Chemistry and technology of 2-alkenyl azlactones. Journal of Polymer Science Part A: Polymer Chemistry 2001, 39 (21), 3655.

(52) Heilmann, S. M.; Moren, D. M.; Krepski, L. R.; Rasmussen, J. K.; Gaddam, B. N.; Roscoe, S. B.; Lewandowski, K. M.; McIntosh, L. H.; Roberts, R. R.; Fansler, D. D. et al. The Chemistry of 2-Alkenyl-5(4H)-Oxazolones. IX. Acid-Catalyzed Oligomerization. Journal of Macromolecular Science, Part A 2003, 40 (8), 755.
(53) Wang, S.; Liu, K.; Yao, X.; Jiang, L. Bioinspired Surfaces with Superwettability: New Insight on Theory, Design, and Applications. Chemical Reviews 2015, 115 (16), 8230.
(54) Wen, L.; Tian, Y.; Jiang, L. Bioinspired Super-Wettability from Fundamental Research to Practical Applications. Angewandte Chemie-International Edition 2015, 54 (11), 3387.
(55) Rasmussen, J. K.; Heilmann, S. M.; Krepski, L. R.; Jensen, K. M.; Mickelson, J.; Johnson, K. Crosslinked, hydrophilic, azlactone-functional polymeric beads: a two-step approach. Reactive Polymers 1992, 16 (2), 199.

The invention claimed is:

1. A multilayer film comprising one or more bilayers, wherein each bilayer comprises a first polymer layer covalently linked with a second polymer layer,
wherein the first polymer layer comprises a portion of unhydrolyzed functionalized azlactones having the formula:

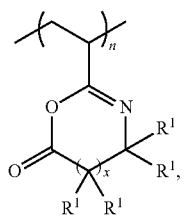

and
wherein the first polymer layer comprises a portion of hydrolyzed functionalized azlactones having the formula:

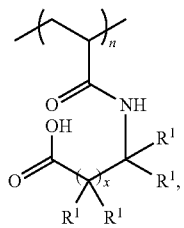

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted, and
wherein each bilayer has nanoscale or microscale porosity and nanoscale or microscale surface roughness.

2. The multilayer film of claim 1 wherein the first polymer layer comprises a polymer selected from the group consisting of poly(vinyl-4,4-dimethylazlactone), poly(2-vinyl-4,4-dimethyl-2-oxazolin-5-one), poly(2-isopropenyl-4,4-dimethyl-2-oxazolin-5-one), poly(2-vinyl-4,4-diethyl-2-oxazolin-5-one), poly(2-vinyl-4-ethyl-4-methyl-2-oxazolin-5-one), poly(2-vinyl-4-dodecyl-4-methyl-2-oxazolin-5-one), poly(2-vinyl-4,4-pentamethylene-2-oxazolin-5-one), poly (2-vinyl-4-methyl-4-phenyl-2-oxazolin-5-one), poly(2-isopropenyl-4-benzyl-4-methyl-2-oxazolin-5-one), and poly (2-vinyl-4,4-dimethyl-1,3-oxazin-6-one).

3. The multilayer film of claim 1 wherein the second polymer layer comprises a primary amine functionalized polymer, an alcohol functionalized polymer, or a thiol functionalized polymer.

4. The multilayer film of claim 1 wherein the second polymer layer comprises an optionally functionalized polymer selected from the group consisting of polyolefins, poly(alkyls), poly(alkenyls), poly(ethers), poly(esters), poly (mides), polyamides, poly(aryls), poly(heterocycles), poly (ethylene imines), poly(urethanes), poly($\alpha,\beta$-unsaturated carboxylic acids), poly($\alpha,\beta$-unsaturated carboxylic acid derivatives), poly(vinyl esters of carboxylic acids), poly (vinyl halides), poly(vinyl alkyl ethers), poly(N-vinyl compounds), poly(vinyl ketones), poly(vinyl aldehydes) and any combination thereof.

5. The multilayer film of claim 1 wherein at least a portion of residual functional groups in the one or more bilayers is reacted with a hydrophobic amine selected from the group consisting of n-propylamine, n-octylamine, n-decylamine, an amino sugar, amino alcohol, amino polyol, glucamine, dimethylaminopropylamine (DMAPA), and combinations thereof.

6. The multilayer film of claim 1 wherein the portion of hydrolyzed functionalized azlactones is 17% or less of the total hydrolyzed and unhydrolyzed functionalized azlactone content.

7. The multilayer film of claim 6 wherein said bilayer is superhydrophobic.

8. The multilayer film of claim 1 wherein the first polymer layer comprises PVDMA and the second polymer layer comprises poly(ethylenimine) (PEI).

9. The multilayer film of claim 1 wherein the first polymer layer further comprises one or more copolymers, wherein said one or more copolymers comprise an acrylate polymer, methacrylate polymer, styrene polymer, vinyl polymer, or combinations thereof.

10. A multilayer film comprising one or more bilayers, wherein each bilayer comprises a first polymer layer covalently linked with a second polymer layer,
wherein the first polymer layer comprises a portion of unhydrolyzed functionalized azlactones having the formula:

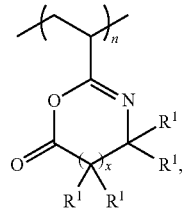

and
wherein the first polymer layer comprises a portion of hydrolyzed functionalized azlactones having the formula:

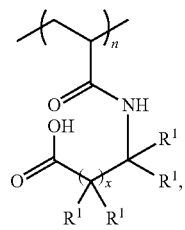

wherein x is 0 or the integers 1 or 2; and each $R^1$ is independently selected from the group consisting of: hydrogen, alkyl groups, alkenyl groups, alkynyl groups, carbocyclic groups, heterocyclic groups, aryl groups, heteroaryl groups, alkoxy groups, aldehyde groups, ether groups, and ester groups, any of which may be substituted or unsubstituted, wherein said bilayer has nanoscale or microscale porosity and nanoscale or microscale surface roughness; and wherein the portion of hydrolyzed functionalized azlactones is sufficient to result in said multilayer film being superhydrophobic.

11. The multilayer film of claim 10 wherein the portion of hydrolyzed functionalized azlactones is 17% or less of the total hydrolyzed and unhydrolyzed functionalized azlactone content.

12. The multilayer film of claim 10 wherein said multilayer film is superhydrophobic without having any of the functional groups in the bilayer reacted with an additional amine.

\* \* \* \* \*